US008572489B2

(12) United States Patent
Millington et al.

(10) Patent No.: US 8,572,489 B2
(45) Date of Patent: Oct. 29, 2013

(54) HANDLEBAR AUDIO CONTROLS

(75) Inventors: Jeffrey A. Millington, Rochester Hills, MI (US); Steven Montealegre, Farmington Hills, MI (US); Angelo A. Giannotti, Riverview, MI (US)

(73) Assignee: Harman International Industries, Incorporated, Northridge, CA (US)

( * ) Notice: Subject to any disclaimer, the term of this patent is extended or adjusted under 35 U.S.C. 154(b) by 194 days.

(21) Appl. No.: 12/970,518

(22) Filed: Dec. 16, 2010

(65) Prior Publication Data
US 2012/0159328 A1 Jun. 21, 2012

(51) Int. Cl.
*G06F 3/00* (2006.01)
*G06F 3/048* (2013.01)
*G06F 3/14* (2006.01)
*G06D 1/00* (2006.01)
*H04B 1/00* (2006.01)
*B62J 7/00* (2006.01)

(52) U.S. Cl.
USPC ........... 715/716; 715/700; 715/764; 715/864; 715/866; 701/1; 381/86; 224/413

(58) Field of Classification Search
None
See application file for complete search history.

(56) References Cited

U.S. PATENT DOCUMENTS

| | | | | |
|---|---|---|---|---|
| 4,638,131 A * | 1/1987 | Kidd et al. | ................. | 200/61.55 |
| 4,981,243 A * | 1/1991 | Rogowski | ..................... | 224/431 |
| 5,357,177 A * | 10/1994 | Fey et al. | ........................... | 318/3 |
| 6,049,290 A * | 4/2000 | Halstead | ...................... | 340/7.63 |
| 6,264,146 B1 * | 7/2001 | Hill et al. | ...................... | 244/234 |
| 6,360,149 B1 * | 3/2002 | Kwon et al. | .................... | 701/41 |
| 6,542,758 B1 * | 4/2003 | Chennakeshu et al. | ..... | 455/569.2 |
| 6,804,593 B2 * | 10/2004 | Kitano et al. | ................... | 701/41 |
| 6,983,170 B2 * | 1/2006 | Stulberger | ................. | 455/556.1 |
| 7,017,704 B2 * | 3/2006 | Kapaan et al. | ................ | 180/315 |
| 7,519,386 B2 * | 4/2009 | Kespohl et al. | ............ | 455/550.1 |
| 7,837,595 B2 * | 11/2010 | Rice | ................................. | 482/4 |
| 7,928,310 B2 * | 4/2011 | Georges et al. | ................. | 84/645 |
| 8,387,470 B2 * | 3/2013 | Tuulari et al. | ............ | 73/862.627 |
| 2004/0110585 A1 * | 6/2004 | Guderzo et al. | ................ | 474/70 |
| 2005/0123148 A1 * | 6/2005 | Ohler | ............................. | 381/86 |
| 2006/0265653 A1 * | 11/2006 | Paasonen et al. | ............. | 715/704 |
| 2007/0100523 A1 * | 5/2007 | Trachte | .......................... | 701/41 |
| 2008/0156178 A1 * | 7/2008 | Georges et al. | ................. | 84/645 |
| 2008/0232891 A1 * | 9/2008 | Macklin et al. | .............. | 400/489 |
| 2010/0082181 A1 * | 4/2010 | Ando | ................................ | 701/1 |
| 2010/0082249 A1 * | 4/2010 | Ando et al. | .................... | 701/211 |
| 2010/0131123 A1 * | 5/2010 | Gannon et al. | .................... | 701/3 |
| 2011/0074689 A1 * | 3/2011 | Sentchenkoff et al. | ....... | 345/168 |

FOREIGN PATENT DOCUMENTS

WO     WO 2009/145786 A1 * 12/2009

* cited by examiner

Primary Examiner — Matt Kim
Assistant Examiner — Yongjia Pan
(74) Attorney, Agent, or Firm — Brinks Hofer Gilson & Lione

(57) ABSTRACT

A vehicle audio system having handlebar mounted controls that permit an operator to control the audio system utilizing finger controls mounted on the handlebars.

18 Claims, 20 Drawing Sheets

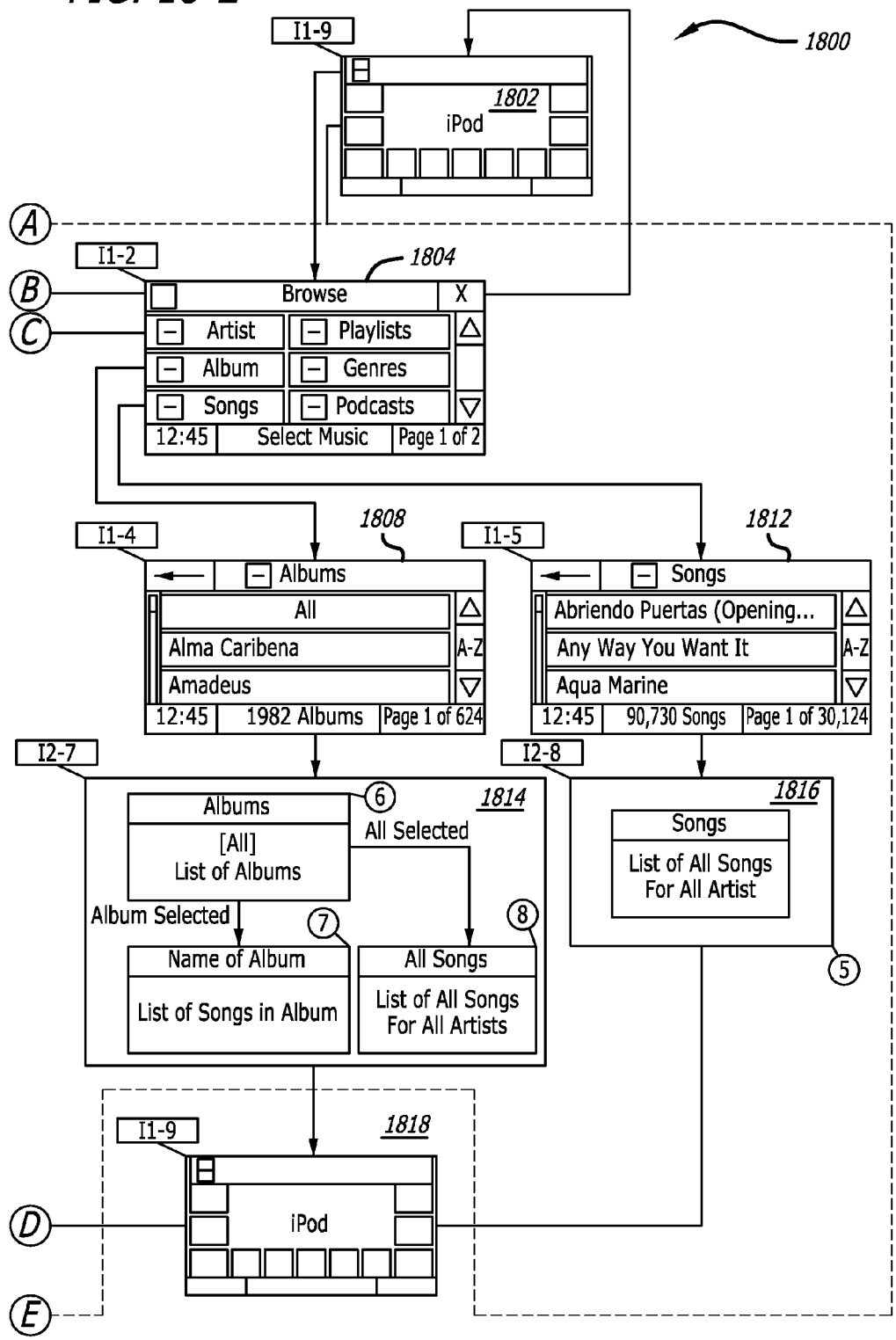

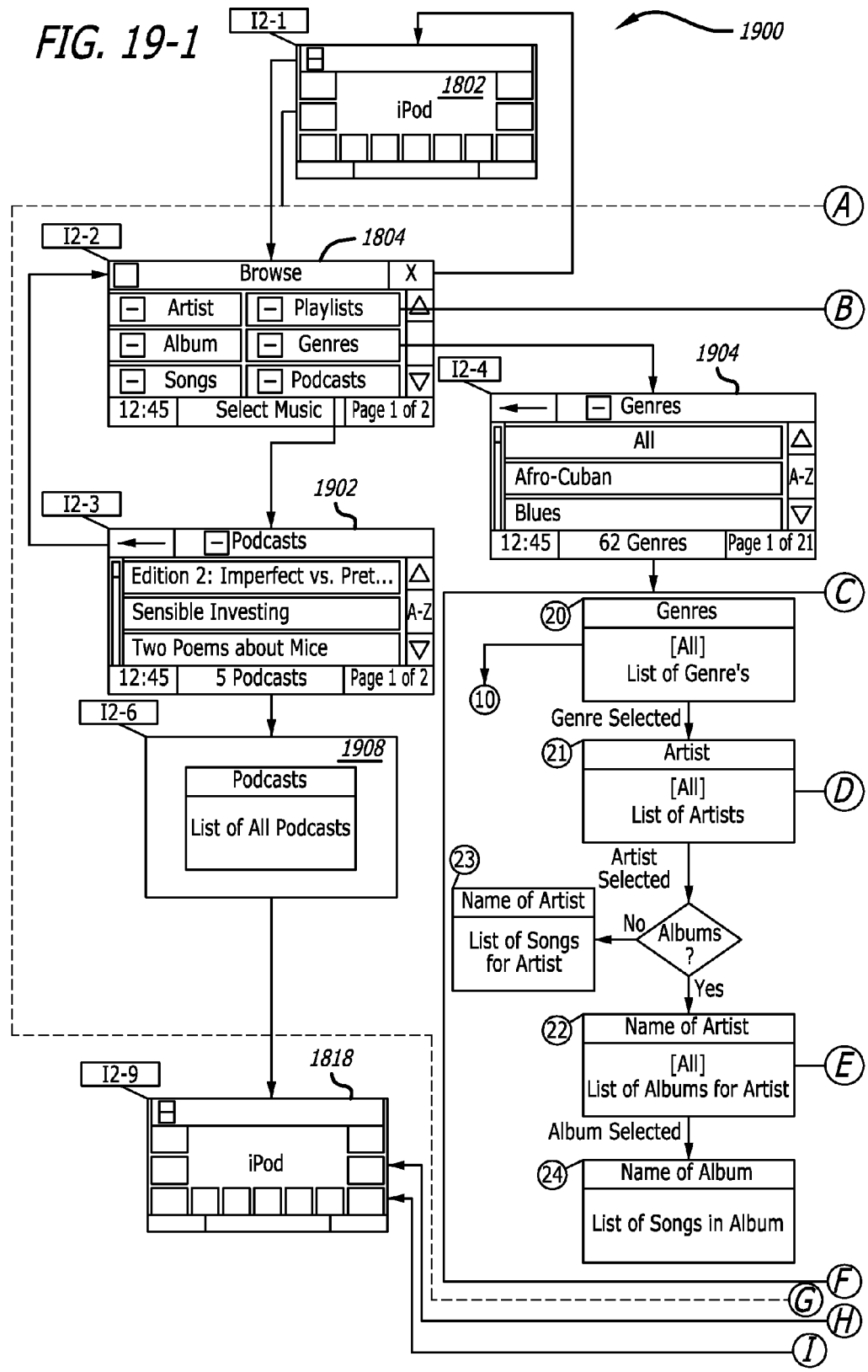

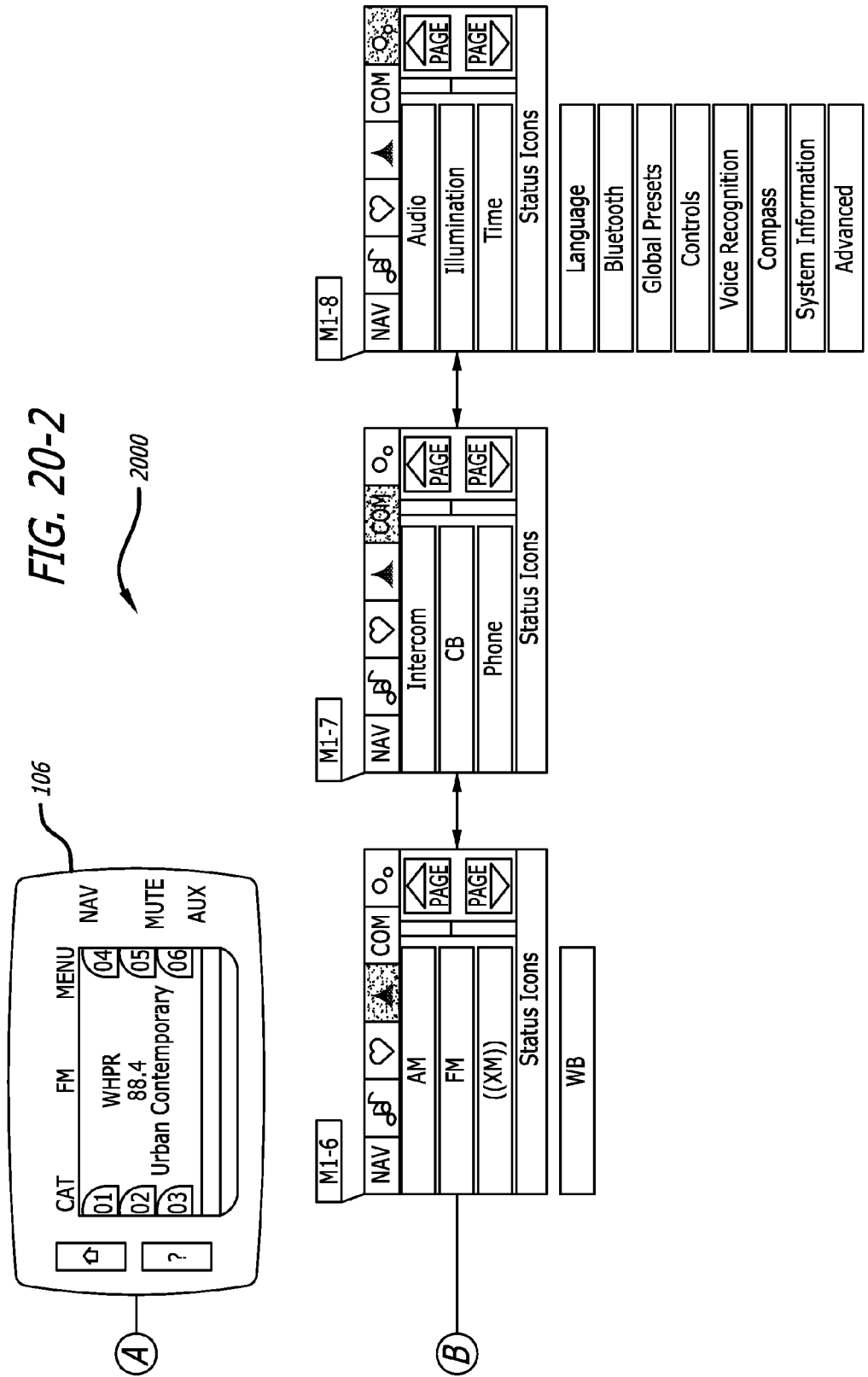

HANDLEBAR AUDIO CONTROLS

BACKGROUND

1. Field of the Invention

The present invention relates to vehicle audio systems and, more particularly, to handlebar controls for a vehicle audio system.

2. Related Art

Vehicle audio systems that are located in vehicles steered or controlled with handlebars are typically controlled with knobs and buttons. In order to operate such audio systems, an operator has to remove a hand from the handlebar. This creates a dangerous situation where only one hand must maintain control over the direction of the vehicle and often maintain control while traversing uneven pavement and other dangerous road conditions.

As audio devices incorporate new technologies, such as personal audio players, MP3 players, Flash Memory, GPS units, and other such devices, the operation of such audio devices requires more steps and additional mental concentration. Thus, an increased risk may occur for accidents as vehicles with handlebars have audio systems incorporated into their designs. Prior approaches to simplify the operations of the vehicle audio system when installed in vehicles with handlebars have been made.

Examples of prior attempts to partially solve this problem include making the vehicle audio system operate with push buttons rather than knobs. A problem with this and similar approaches is that a vehicle operator still has to remove one of their hands from the handlebar. Other attempts have included buttons or knobs that may be redefined depending upon the mode of the audio system. Once again, depending upon the mode of operation, the vehicle operator must remove one of their hands from the handlebars to operate the audio system, depending upon the mode of the operation, even if the button may be remapped by the system. Furthermore, the system remapping of buttons may not be intuitive to every user.

Accordingly, a need exists for an approach to simplify the operation of audio systems on vehicles with handlebars. In particular, it is desirable to have handlebar audio controls that enable the operation of the audio system to operate the system without requiring the vehicle operator to remove their hands from the handlebars.

SUMMARY

In view of the above, a vehicle audio system for a handlebar controlled vehicle is provide that includes finger controls to enable an operator to operate the handlebar controlled vehicle and the vehicle's audio system without removing their hands from the handlebar controlled vehicle. The approach also includes being able to record preset actions and select the actions, thus reducing the number of steps from multiple finger motions to only a few.

By using one or more multi-way finger controls integrated with the handlebars of a vehicle, the user is aided in the use of different types of electronic devices, including audio systems. The ability to customize or change the way the audio systems operate via defining presets for commands, in addition to content, also aids in the use of the different types of electronic devices with controls mounted on handlebars.

It is to be understood that the features mentioned above and those yet to be explained below can be used not only in the respective combinations indicated, but also in other combinations or in isolation without departing from the scope of the invention.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The description below may be better understood by reference to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
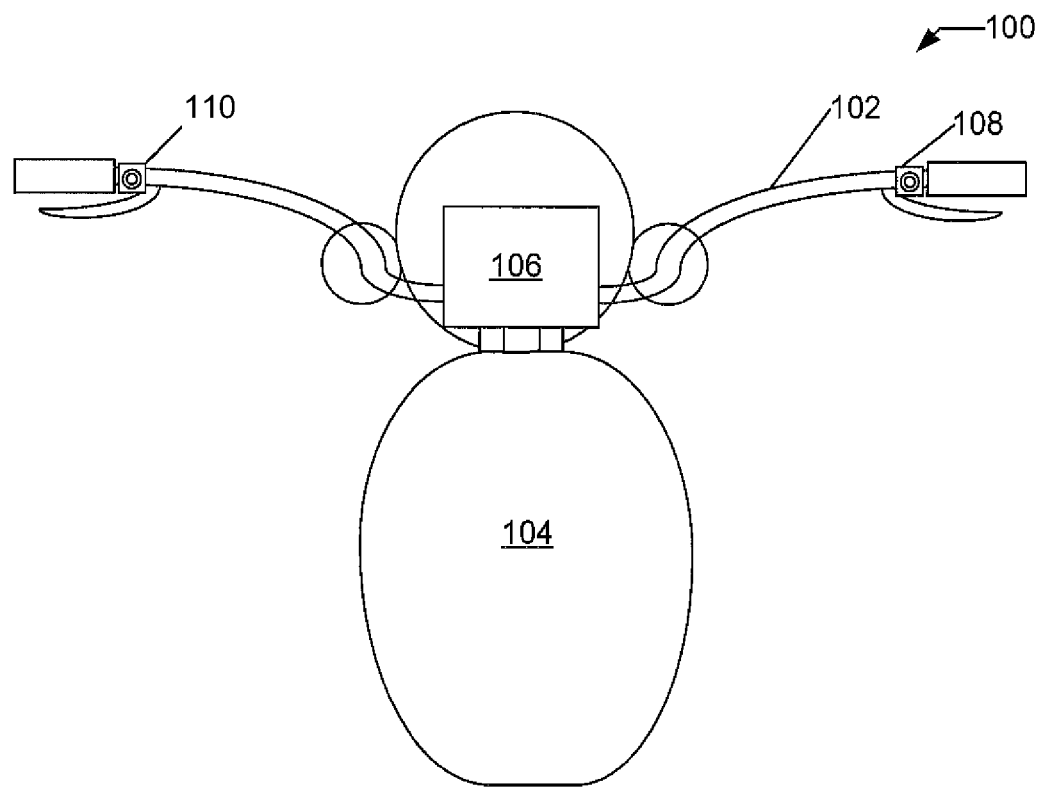
FIG. 1 is a diagram of a handlebar controlled vehicle with a vehicle audio system in accordance with one example of an implementation of the invention.

It is to be understood that the following descriptions of various examples of implementations are given for purposes of illustration only and are not to be read in a limiting sense. The partitioning of examples in function blocks, modules or units shown in the drawings is not to be construed as indicating that these function blocks, modules or units are necessarily implemented as physically separate units. Functional blocks, modules or units, shown or described may be implemented as separate units, circuits, functions, modules, interfaces, or circuit elements. One or more functional blocks, units or devices may also be implemented in a common circuit, chip, circuit element or unit.

FIG. 1 depicts a diagram of one example of an implementation of a handlebar controlled vehicle 100 with a vehicle audio system 106. Examples of a handlebar controlled vehicle 100 may include motorcycles, mopeds, bicycles, tricycles, and scooters. The handlebars 102 are typically connected or coupled to the vehicle body 104 with a joint (not shown) that enables the handlebars to turn and control the direction of the handlebar controlled vehicle 100. It is not uncommon to find handlebar controlled vehicles 100 with a vehicle audio system 106. The vehicle audio system 106 may be a radio, compact disc player, MP3 player, other audio/video device, or a combination of a radio, compact disc player, MP3 player, other audio/video device, or any of the foregoing. The vehicle audio system 106 is shown as being integrated/mounted or otherwise affixed to the handlebar controlled vehicle 100. In other examples of implementations, the vehicle audio system 106 may be temporary attached or otherwise associated with the handlebar controlled vehicle 100. An example of a device that is associated with the handlebar vehicle audio system 106 may be a cellular telephone device that is Bluetooth enabled, which is capable of playing MP3 audio files and is located upon a person using the handlebar controlled vehicle 100.

The handlebar 102 is depicted with two "finger control" devices 108 and 110 that are in communication with the vehicle audio system 106. The finger control devices 108 and 110 may be controlled with a single finger, such as a thumb and may control the operation of the vehicle audio system 106. In the current example, two finger control devices 108 and 110 are shown. In other examples of implementations, a different number of control devices may be employed, including the use of only one finger control device.

Figure 2A:
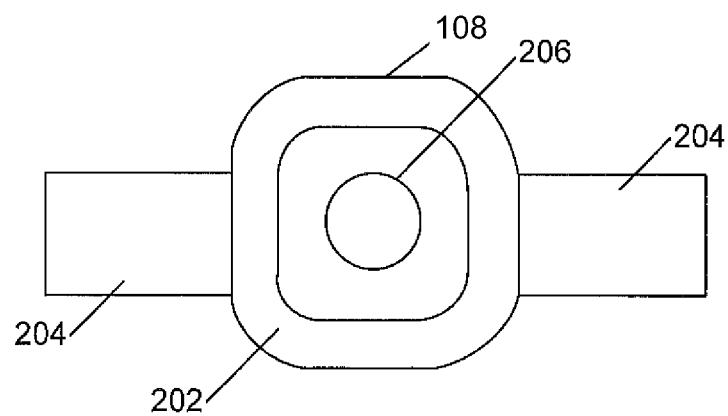
FIG. 2a is a diagram of one example of a finger control device in communication with a vehicle audio system of FIG. 1.

FIG. 2a illustrates one example of a diagram of the finger control device 108 of FIG. 1 that is in communication with the vehicle audio system 106. The finger control device 108 may have a housing 202 with a mount 204 for securing the housing 202 to the handlebar 102 of the handlebar controlled vehicle 100. The mount 204 may be attached to the handlebar 102 by clamping force, glue, screws or other fasteners. In other examples of various implementations, the housing 202 may reside within or be integrated with the handlebar 102 or the handlebar 102 controls of the handlebar controlled vehicles 100. In addition to the housing 202, a moveable pin or stick 206 may be located within the housing 202, which extends upward from the housing 202 in at least one direction. The moveable pin or stick 206 is of a size and height to allow a user's finger to easily engage the moveable pin 206 within the housing 202. The moveable pin or stick 206 (a multi-way toggle may also be employed) may have at least four degrees of movement, namely up, down, right, and left. In other examples, an additional degree for movement may also be employed in the up/down direction or in the form of rotational movement. In operation, the moveable pin or stick 206 may be engaged by a user's thumb to modify the operation of the vehicle audio system 106.

Figure 2B:
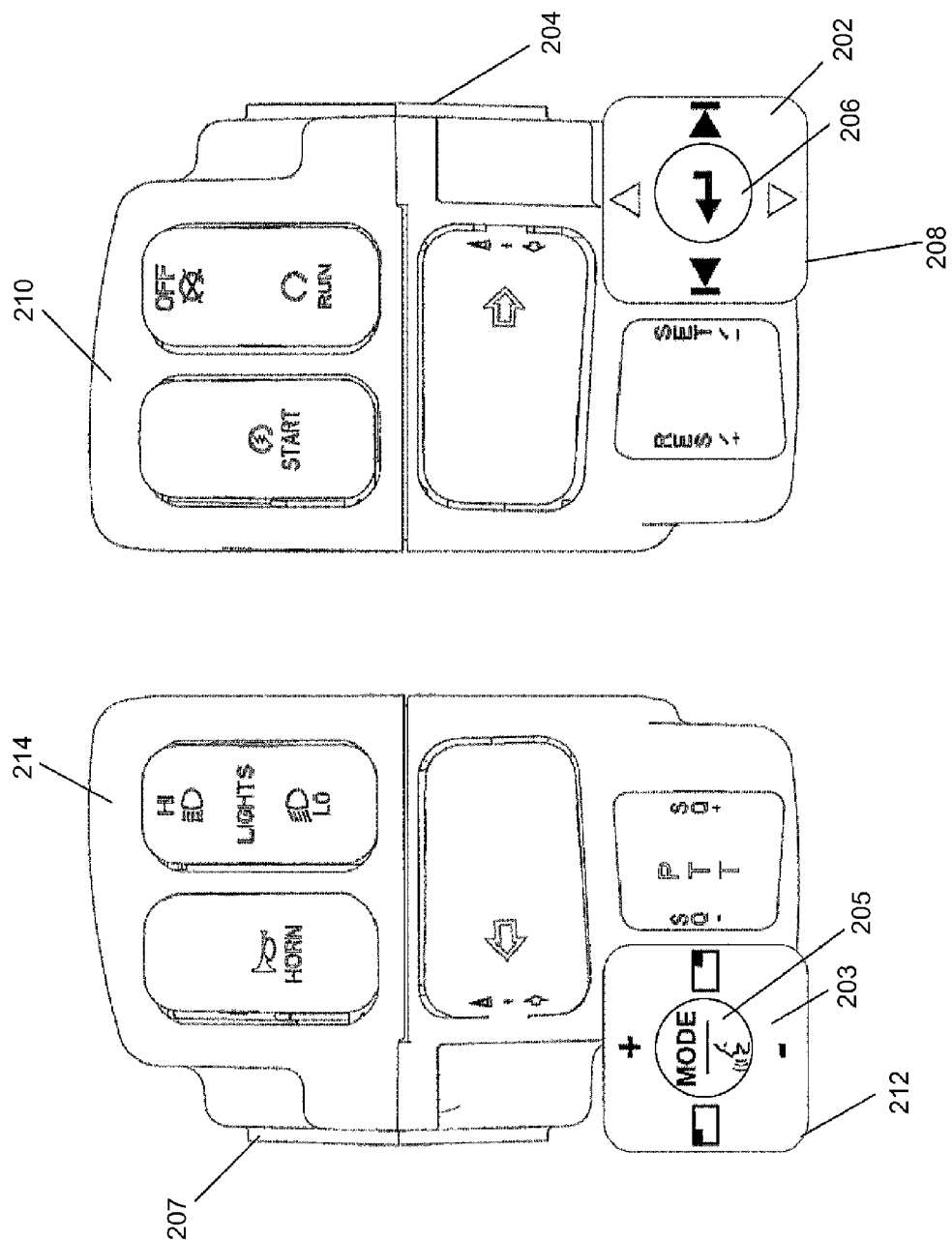
FIG. 2b is a diagram of one example of finger control devices integrated with other handlebar controls in accordance with the invention.

FIG. 2b is a diagram of one example of finger control devices 208, 212 integrated with other handlebar controls 210, 214. In the illustrated example, the right finger control device 208 may be integrated or grouped with other handlebar controls 210, such as start, off, and right turn signal controls. The handlebar controls 210 may be affixed to the handlebar of a vehicle with a mount 204. The finger control device 208 may have a housing 202 and moveable pin or stick 206. In other examples of implementations, a multi-way rocker switch may be employed. Similarly, the left finger control device 212 may also have a housing 203 and moveable pin or stick 205. The left finger control device 212 may also be integrated or grouped with left handlebar controls 214, such as horn, lights, and left turn signal controls. The left handlebar controls 214 may be affixed to the handlebar with mount 207. Furthermore, the right and left finger control devices 208 and 212 may also have graphics or other symbols that aid in identifying the types of common actions that may be activated with the finger control devices 208 and 212.

Figure 3:
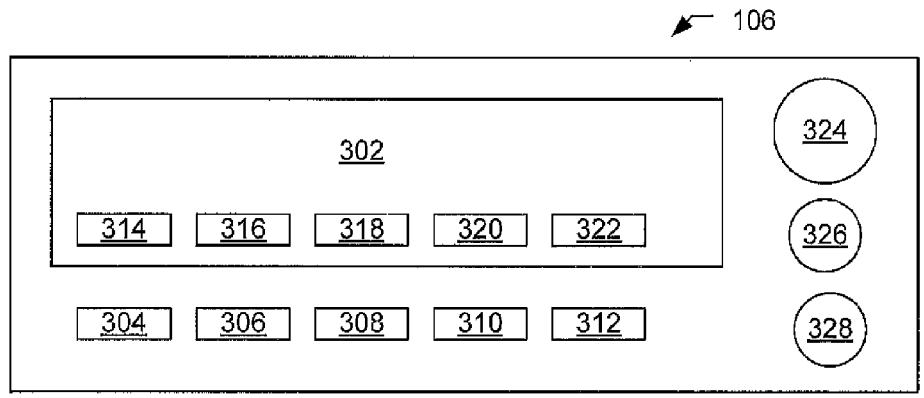
FIG. 3 is a diagram of one example of an implementation of a vehicle audio system that receives communication from the finger control of FIG. 1.

FIG. 3 illustrates a diagram of one example of a vehicle audio system 106 that receives communication from the finger controls 108, 110 (FIG. 1) and 208, 212 (FIG. 2b). The vehicle audio system 106 may have a display 302 that provides operation information, such as station, track, operation mode, power indication, to name but a few. The display 302 may be, for example, a light emitting diode (LED) display or a Liquid Crystal Display (LCD). The regions of the display 302 may be associated with function keys 304-312 that may have their functions (displayed as 314-322) and redefined depending upon the operation mode/state of the vehicle audio system 106. The vehicle audio system 106 may also have knobs or dials (324 and 326) that may aid in the tuning or operation (i.e., volume) of the vehicle audio system 106. One or more jacks or ports, such as 328, may also be available for connection of headsets or headphones (not shown).

Figure 4:
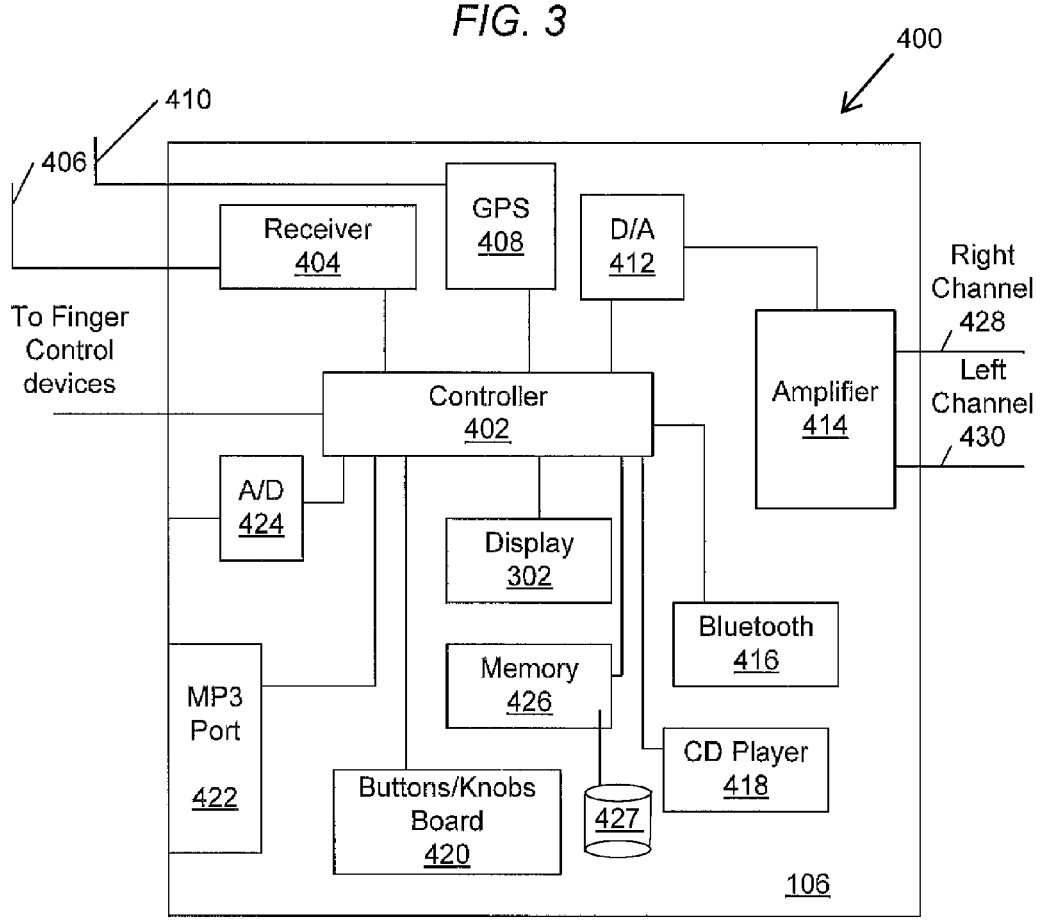
FIG. 4 is a block diagram of one example of a vehicle audio system that may be implemented in accordance with the invention.

Turning to FIG. 4, FIG. 4 is a block diagram 400 of the vehicle audio system 106 of FIG. 3. The vehicle audio system 106 may have one or more controllers 402, such as digital signal processors and/or microprocessors. The controller 402 may be coupled to (i) a receiver 404 that is also coupled to an antenna 406, (ii) a GPS engine 408 that is coupled to a GPS antenna 410, (iii) finger control devices (such as 108, 110 (FIG. 1) and 208, 212 (FIG. 2b)), (iv) a digital-to-analog (D/A) converter 412 that may also be coupled to an amplifier 414, (v) a Bluetooth transceiver 416, (vi) a display 302, (vii) a compact disc (CD) player 418, (viii) buttons/knobs board 420, (ix) a MP3 port 422, (x) analog-to-digital converter 424, and (xi) memory 426. The memory 426 may also have a database 427 capable of storing device queries. The amplifier 414 may also have right and left audio channel outputs 428 and 430, respectively.

The receiver 404 may be an AM/FM receiver that is adapted to be tuned by the controller 402 in response to input from a user. The GPS engine 408 may be a GPS receiver that both receives GPS signals and processes the signals into location data. The Bluetooth transceiver 416 may be employed for communicating and controlling devices, such as cellular telephones, MP3 players, computers, headphones, and speakerphones. The CD player 418 is depicted as a compact disc player, but in other implementations DVD players, CD/DVD recorders or other digital playback/recording devices may be employed in place of the CD player or in addition to the CD player. The MP3 port 422 may be a port for connection to a MP3 player such as the IPOD™ or SANSA™ E200, to name only a few examples. If a MP3 port 422 is unavailable, then the MP3 player or other audio device may connect to the A/D converter 424 via a patch cord. A memory 426 may be used to store operation data, presets, and digitized content. The display 302 may be a LCD display, LED display, or other type of graphical/visual display device capable of displaying a graphical menu in some implementations. The graphical menu may be traversed using one or more finger controllers, such as 108 and 110. The display 302 may also be a touch screen display that enables input data to be entered via touching the screen. In other examples of implementations, the display 302 may map button functions to buttons that may change as the displayed menus change. The vehicle audio system 106 may be independently powered, or powered via a vehicle battery (not shown).

Figure 5:
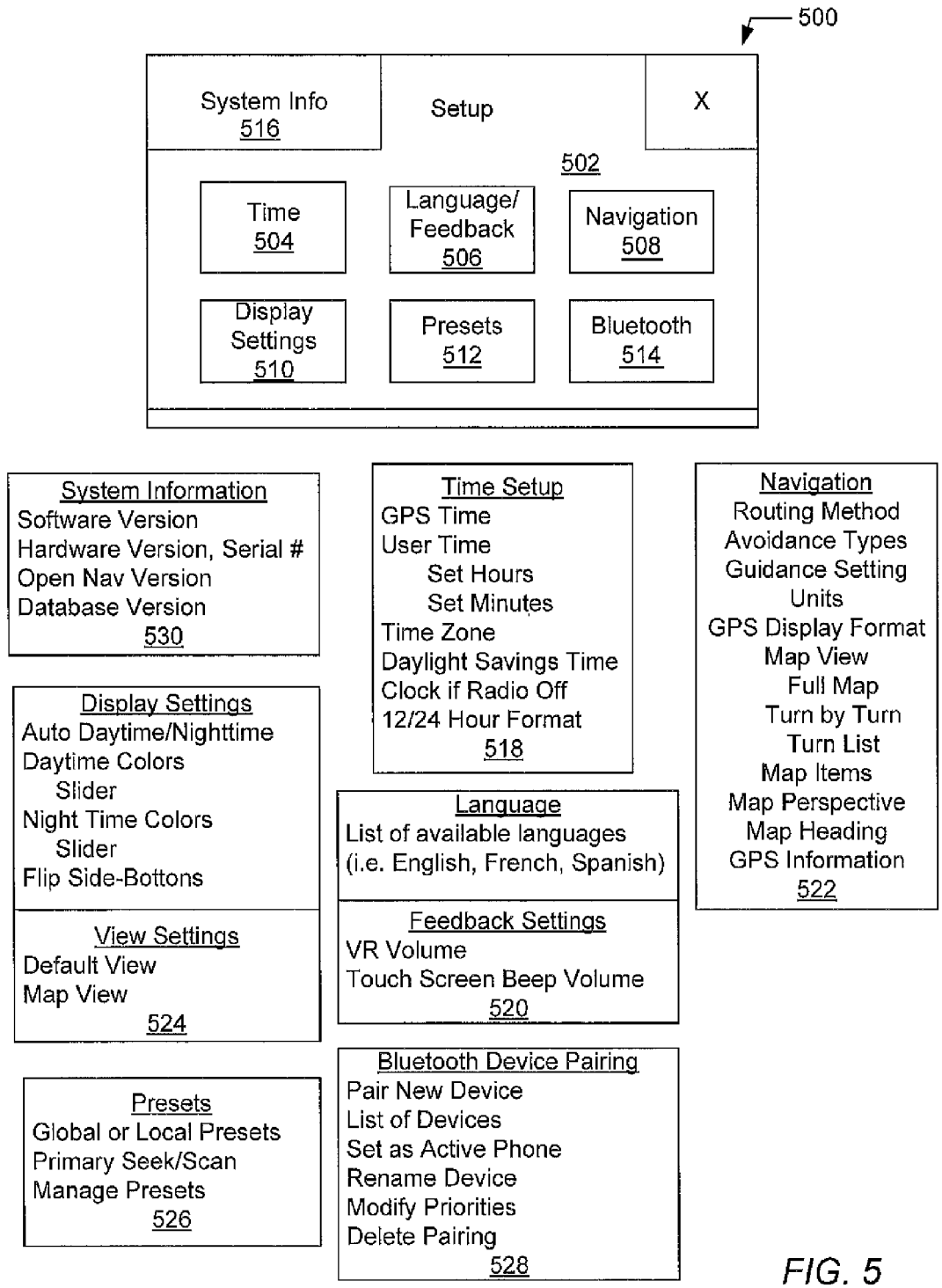
FIG. 5 is a diagram of one example of a setup mode display that may be utilized in the vehicle audio system in accordance with the invention.

In FIG. 5, a diagram 500 of one example of a setup mode display 502 that may be utilized in the vehicle audio system 106 of FIG. 3 is depicted. Upon activation of one of the buttons, such 326 (FIG. 3), a setup mode may be entered with a predetermined setup mode display 502. The setup mode display 502 may have additional selections, such as time 504, language/feedback 506, navigation 508, display settings 510, presets 512, Bluetooth device pairing 514, and system information 516.

When time 504 is selected on the setup display 502, a time setup submenu may be displayed 518. The time setup submenu 518 may have selections for GPS time, user time, set hours, set minutes, time zone, daylight savings, clock if radio off, 12/24 hour format. Each of these selections may have one or more additional screens that further enable a user to change or modify the setup of the vehicle audio system 106.

When language 506 is selected on the setup display 502, a language submenu 520 may be displayed. The language submenu 520 may contain both language items and feedback settings, such as, list of available languages, virtual voice volume and touch screen beeps.

When navigation 508 is selected on the setup display 502, a navigation submenu 522 may be displayed. The navigation submenu 522 may contain selections related to navigation, such as routing method, avoidance types, guidance settings, units, GPS display format, arrival time format, map view (full map, turn-by-turn, turn limit), map items, map perspective, map headings, and GPS information.

When display setting 510 is selected on the setup display 502, a display setting submenu 524 may be displayed. The display setting submenu 524 may contain selections related to controlling the display 502. Examples of commands that may be accessed from the display setting submenu 524 may include: auto daytime/nighttime, daytime colors slider, nighttime colors slider, flip side-buttons, default view, and map view.

When presets 512 is selected on the setup display 502, a presets submenu 526 may be displayed. The preset submenu 526 may contain selections for configuring the preset stations and settings associated with the vehicle audio system 106, such as short-cuts to commands within the graphical menu. Examples of commands that may be found in the preset submenu 526 may include: global presets, local presets, primary seek/scan settings, and manage presets. The association of the presets to a command may be recorded and stored in memory. This mapping of the preset allows the operation of the vehicle audio system 106 to be changed and customized by the user.

When Bluetooth 514 is selected on the setup display 502, a Bluetooth submenu 528 may be displayed. The Bluetooth submenu 528 may depict commands for configuring and managing Bluetooth connections. Examples of the commands contained in submenu 528 may include: pair new device, list of devices, set as active phone, rename device, modify priorities, and delete pairing.

When System Information 516 is selected on the setup display 502, a system information submenu 530 may be depicted. The system information submenu 530 may depict the software version, hardware version, serial number, navigation version, and database version. In general, any information pertaining to the audio system or device may be accessed and displayed in the system information submenu 530.

Figure 6:
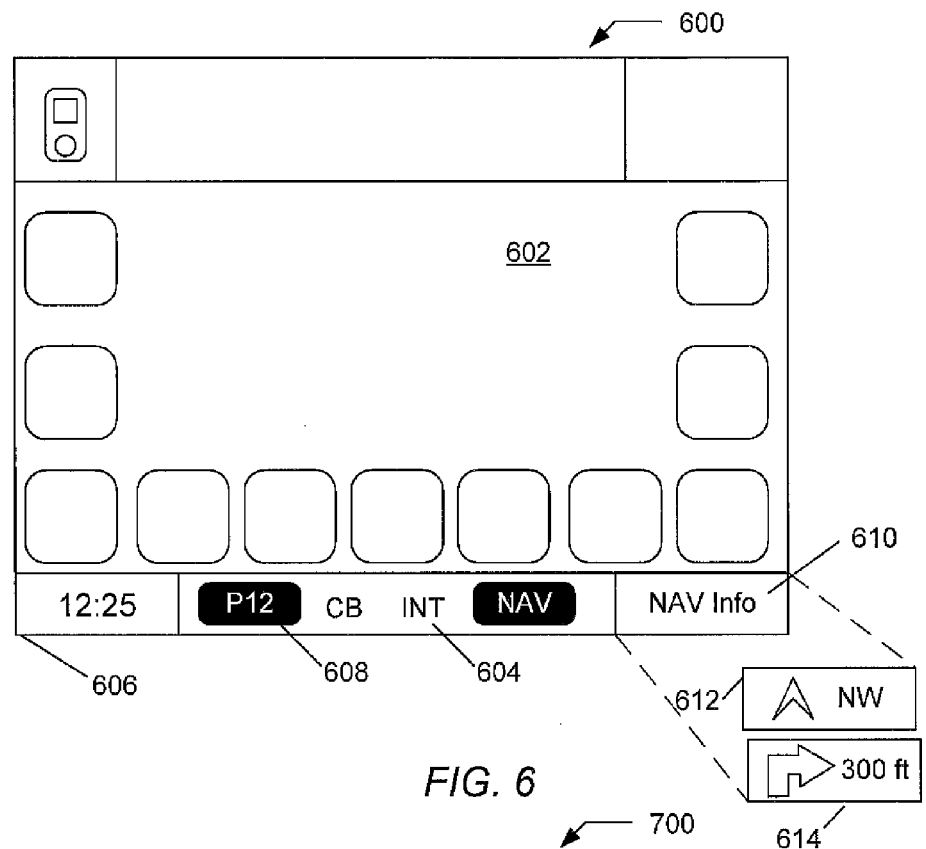
FIG. 6 is a diagram of an audio mode display that may be utilized in the vehicle audio system of FIG. 3.

FIG. 6 illustrates a diagram 600 of the audio mode display 602 in the vehicle audio system 106 of FIG. 3 that has an associated status bar 604. The status bar 604 may be located near the bottom of display 602. The status bar 604 may have data such as time 606, current preset 608, and navigation information 610. The navigation information may be directional information such as a campus 612 or directions 614.

Figure 7:
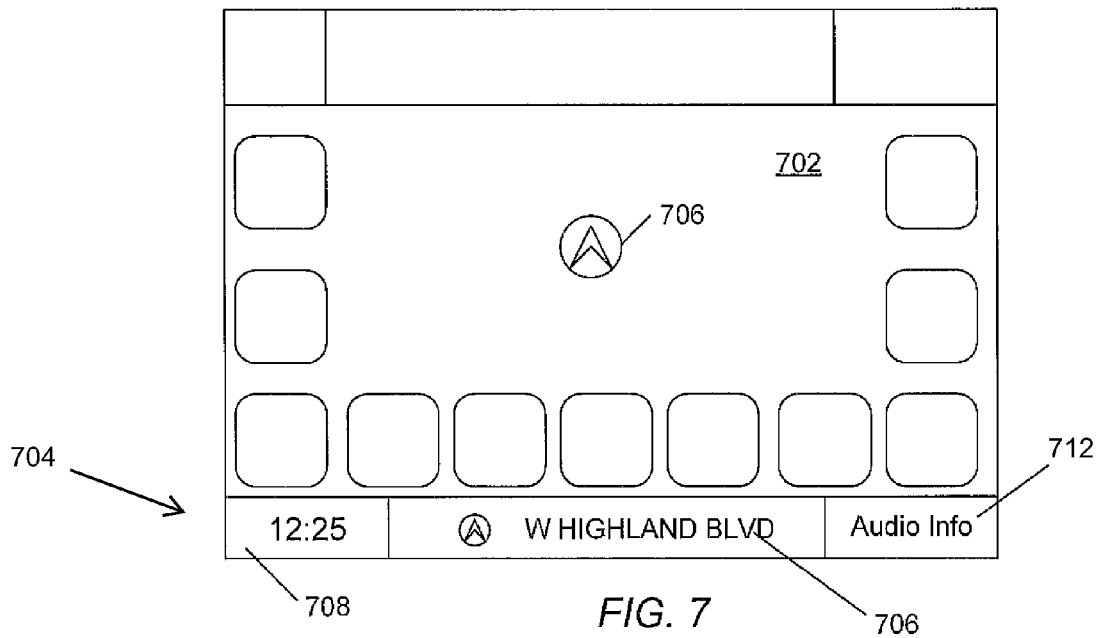
FIG. 7 is a diagram of one example of a navigation mode display that may be utilized in the vehicle audio system of FIG. 3 and that has an associated status bar.

FIG. 7 shows a diagram 700 of an example of a navigation mode display 702 in the vehicle audio system 106 of FIG. 3 that has an associated status bar 704. In the navigation mode, the display 702 may have a position indicator 706 that represents the location and direction of the vehicle in the navigation mode display 702. The status bar 704 associated with the navigation mode display 702 may display data such as time 708, current street 710, and audio information 712.

Figure 8:
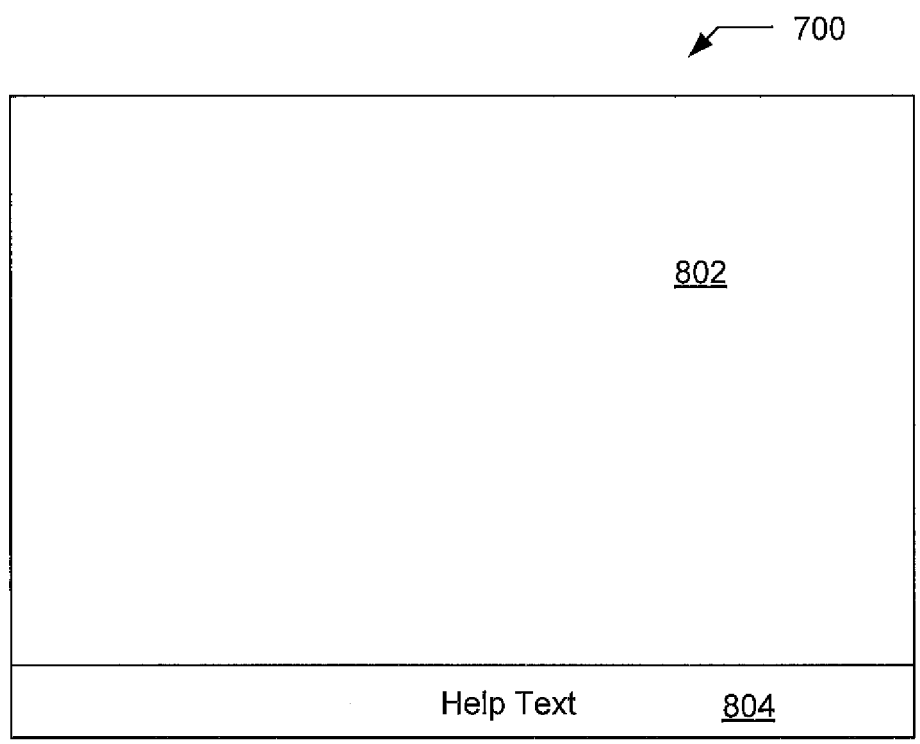
FIG. 8 is a diagram of one example of a setup mode display that may be utilized in the vehicle audio system of FIG. 3.

FIG. 8 illustrates a diagram 800 of one example of a setup mode display 802 in the vehicle audio system 106 of FIG. 3. The setup mode display 802 may depict a map for browsing or selecting a destination. Near the bottom of the setup mode display 802 may be a status bar 804 that contains information, such as help text.

Figure 9:
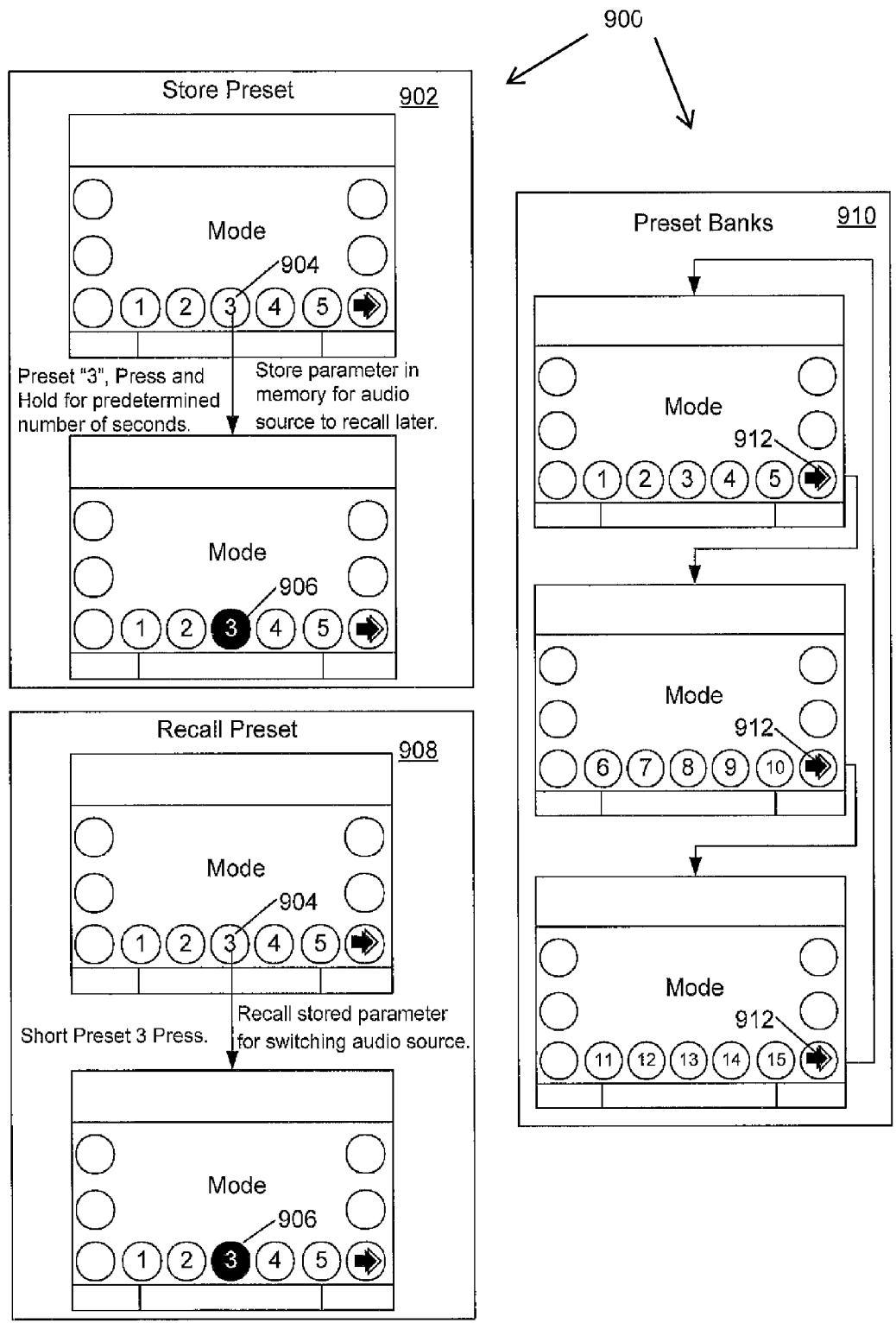
FIG. 9 is an illustration of different events that may be associated with presets in the vehicle audio system of FIG. 3.

In FIG. 9, a depiction 900 of various examples of the different events that may be associated with presets in the vehicle audio system 106 of FIG. 3 is provided. To store preset data 902, a channel selector 904 may be activated and held for a predetermined amount of time, such as three seconds. The channel selector 904 may have an indicator to identify that no presets have been assigned. The indicator may be a first color, such as a white background. After the channel selector 904 has been held for three seconds, a radio frequency (if in the radio operation mode) may be assigned to the channel selector 904. The background color of the channel selector may be change from the first color to a second color 906 to indicate that a preset has been assigned.

A user of the vehicle audio system 106 FIG. 3, may recall presets 908 that have previously been defined. A channel selector 904 may indicate that no presets are assigned. If a recall preset mode is active, then holding the channel selector 904 for a predetermined amount of time results in the last assigned preset being recalled. After the previously assigned preset is recalled, the color of the background of the channel selector 906 may be changed to indicate that the preset has been assigned if the channel selector 906 was not assigned. Banks 910 of presets may be accessed by pressing a next indicator, such as arrow button 912. Depending on the number of presets available, the arrow button may have to be pressed more than once to access the higher numbered presets.

Figure 10:
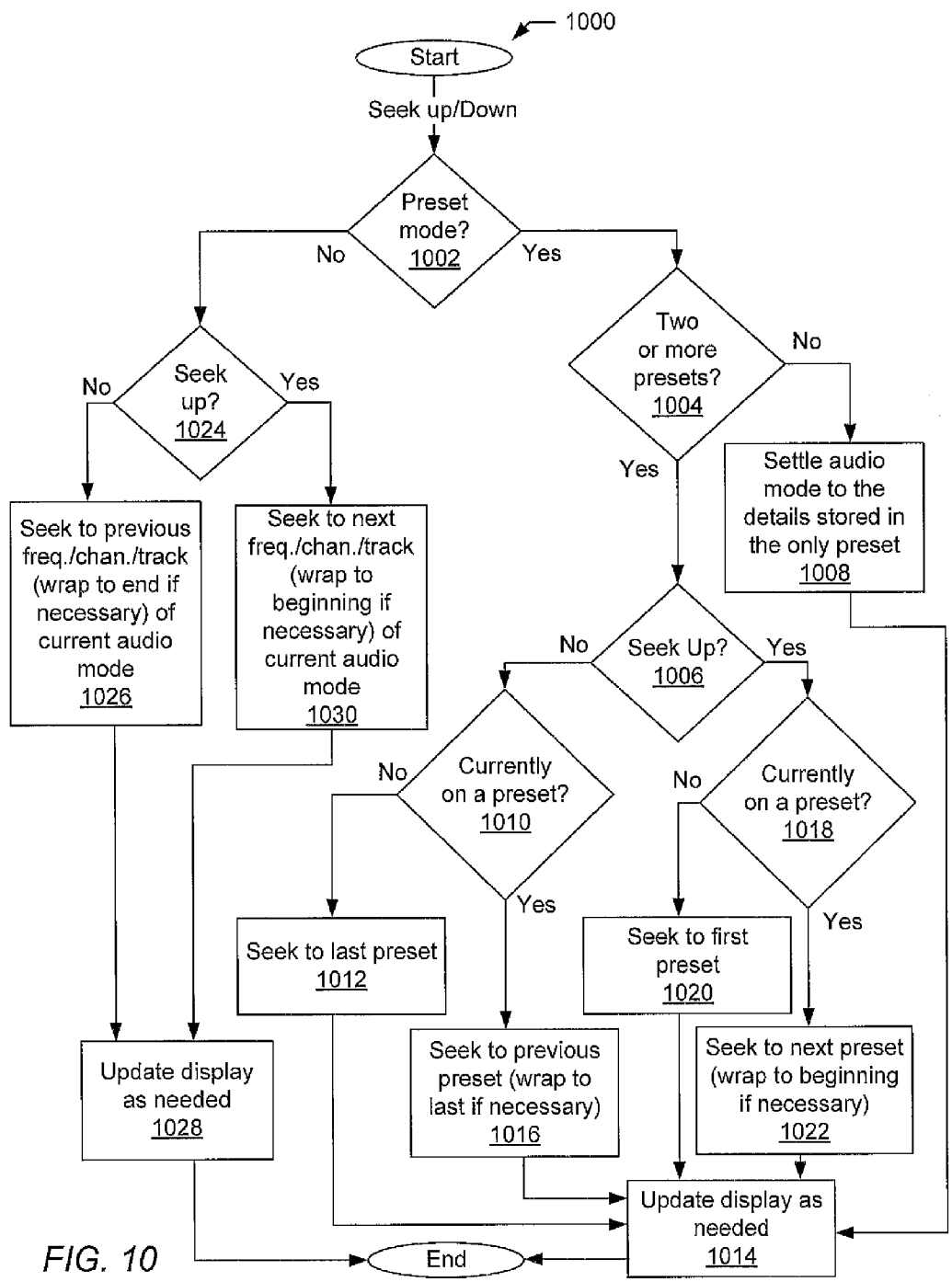
FIG. 10 is a flow diagram of one method for seeking among the presets illustrated in FIG. 9.

Turning to FIG. 10, a flow diagram 1000 of one example of a method for seeking among the presets of FIG. 9 is shown. The flow diagram 1000 starts by determining if the vehicle audio system 106 is in the preset mode of operation 1002. If the vehicle audio system 106 is in the preset mode of operation 1002 and there are two or more stored presets 1004, then a determination is made if seeking is going to up or forward 1006. If there are not two or more stored presets 1004, then select the only stored preset 1008.

If seeking is not to be "up" 1006, then a determination may be made if the vehicle audio system 106 was already tuned to a preset 1010. If the vehicle audio system 106 was not tuned to a preset, the vehicle audio system 106 may be tuned to the last preset that was tuned 1012 to in the vehicle audio system 106. The display may then be updated with the data associated with the selected preset 1014. If the vehicle audio system 106 was tuned to a preset 1010, then the vehicle audio system 106 may be tuned to the previous preset 1016.

If seeking is to be "up" 1006, then a determination made if the vehicle audio system 106 was already tuned to a preset 1018. If the vehicle audio system 106 was not tuned to a preset, the vehicle audio system 106 may be tuned to the first preset defined in the vehicle audio system 106 was tuned 1020. The next preset may then be identified and the next preset may be identified 1014. If the vehicle audio system 106 was tuned to a preset, then the vehicle audio system 106 may be tuned to the next preset 1022.

If the vehicle audio system 106 is not in the preset mode 1002, then a determination is made if seeking is to be "up" 1024. If the determination is not "up" 1024, then seeking to the previous frequency/channel/track of the current audio mode occurs 1026 and the display is updated 1028. If the determination is "up" 1024, then seeking to the next frequency/channel/track of the current audio mode occurs 1030 and the display is updated 1028.

Figure 11:
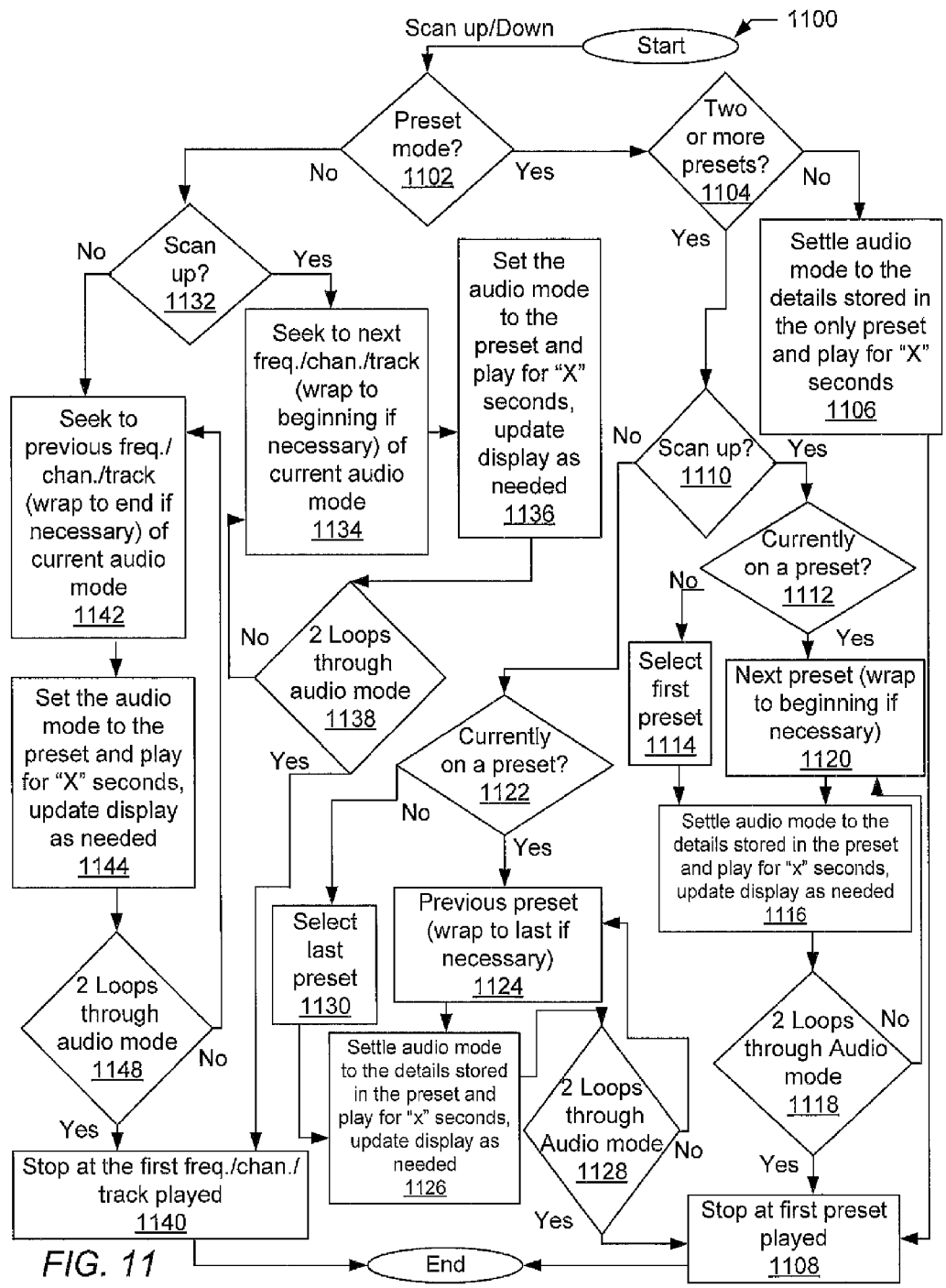
FIG. 11 is a flow diagram of one example of a scanning operation that may be utilized in connection with the vehicle audio system of FIG. 3.

In FIG. 11, a flow diagram 1100 of one example of a scanning operation in the vehicle audio system of 106 FIG. 3 is shown. A check of the operational mode of the vehicle audio system 106 occurs to determine if the operational mode is a "preset mode" 1102. If the vehicle audio system 106 is in a preset mode, then a determination is made if there are two or more presets 1104. If there are not two or more presets 1104, then set the defaults to the previously defined preset 1106 and stop at the first preset played 1108.

If there are two or more presets 1104, then a determination is made if scanning is scanning "up" 1110. If scanning "up" 1110, then a determination occurs to find out if the vehicle audio system 106 is currently on a preset 1112. If the vehicle audio system is not at a preset 1112, then the first preset is selected 1114 and the vehicle audio system 106 is set to a mode that is directed by they preset and played for a predetermined period, such as three seconds 1116 if no additional presets are available 1118, then the present preset is played or otherwise accessed 1108. If all the presets have not been accessed or otherwise played 1118, then the next preset is accessed or otherwise played 1120. In other implementations, other predetermined time periods may be selected such as five seconds or eight seconds.

If the vehicle audio system 106 is at a preset 1112, then the next preset is accessed or otherwise played 1120. Wrapping to the next preset may occur if at the end of the presets and not all of the presets have been accessed or otherwise selected. The vehicle audio system 106 is set to a mode that is directed by the preset and played for a predetermined period, such as five seconds 1116. If all the presets have not been accessed or otherwise played 1118 then the next preset is selected 1120. If all the presets have been accessed or otherwise played 1118, then present preset is not changed 1108.

If there are two or more presets 1104 and scanning up is not to occur 1110, then a determination is made if the vehicle audio system 106 is currently on a preset 1122. If the vehicle audio system is currently on a preset, then the previous or predecessor preset is accessed or otherwise played 1124. Wrapping from the first preset to the last preset may occur in order of all the presets to be accessed or otherwise played. The vehicle audio system 106 is then set according to the details of the current preset 1126. If all the presets have not been accessed or otherwise played 1128, then the previous preset is selected 1124. If all the presets have been accessed or otherwise played 1128, then the current preset is not changed 1108. If a preset is not selected 1122, then the last preset is selected 1130 and the vehicle audio system 106 is then set according to the details of the current present 1126. In other implementations, the cycling through presets may be only the presets that have been previously defined rather than all presets.

If the scanning occurs and the vehicle audio system 106 is not in the preset mode 1102, then a determination is made if the scanning is to be "up" 1132. If the scanning is "up" 1132, then seek to the next frequency/channel/track occurs 1134. The vehicle audio system 106 is then configured in response to the data associated with the current selection 1136. A check is made to determine if all the presets have been accessed or otherwise played 1138. If all the presets have not been accessed, then the next preset is selected 1134. Otherwise, the current preset is not changed 1140. If scanning "up" is not selected, then seeking to the previous frequency/channel/track occurs 1142 and the vehicle audio system 106 is then configure din response to the data associated with the current selection 1144. If there are further selections 1148, then step 1142 is repeated, otherwise the current frequency/channel/track is played 1140.

Figure 12:
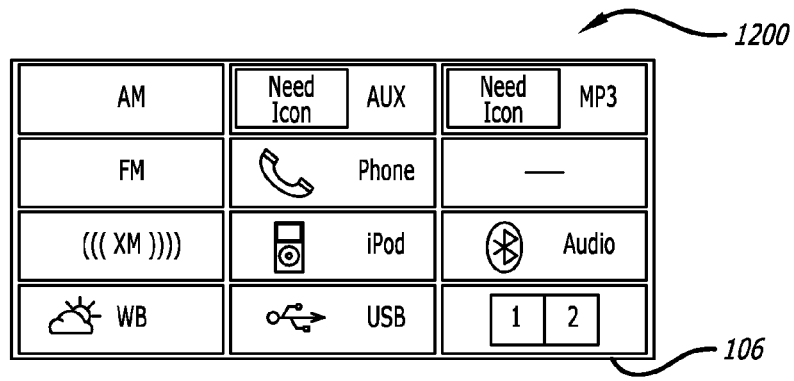
FIG. 12 is a diagram illustrating examples of modes that may be displayed on the display of FIG. 1 and that may be selectable via the finger control device.

Turning to FIG. 12, a diagram 1200 of examples of various modes that may be displayed on the display of FIG. 1 and selectable via a finger control device is provided. A user may select between any of the modes AM, AUX, personal Audio player (such as a MP3 player), FM, PHONE, XM radio, IPod, Bluetooth, Weather, USB or INPUT, by moving the pin 205 finger control device 212. The selection of the mode may be made by pushing down on the pin 205 or by using a timer that when expired selects the mode that a course may be highlighting, such as AM.

Figure 13:
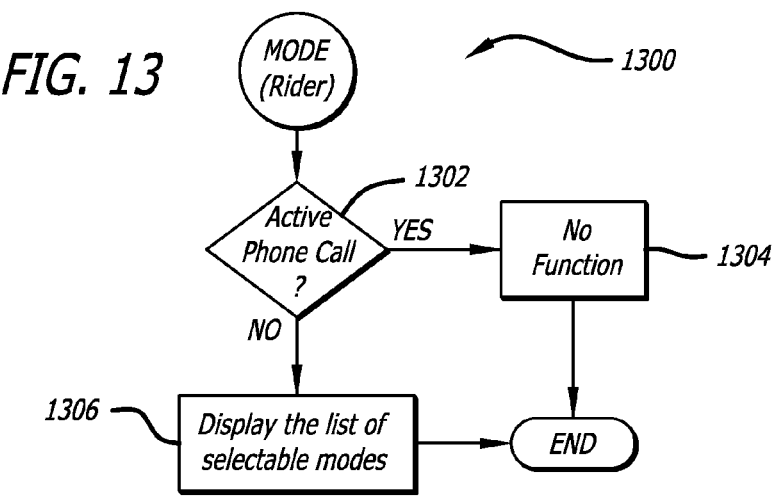
FIG. 13 is a flow diagram of examples of steps for displaying the modes illustrated in FIG. 12.

FIG. 13 is a flow diagram 1300 illustrating example steps for displaying the modes of FIG. 12. If a call is active 1302, then the possible modes (see FIG. 12) are not shown and no other function or modules are executed 1304. If a phone call is not active 1302, then the modes of FIG. 12 are displayed 1306.

Figure 14:
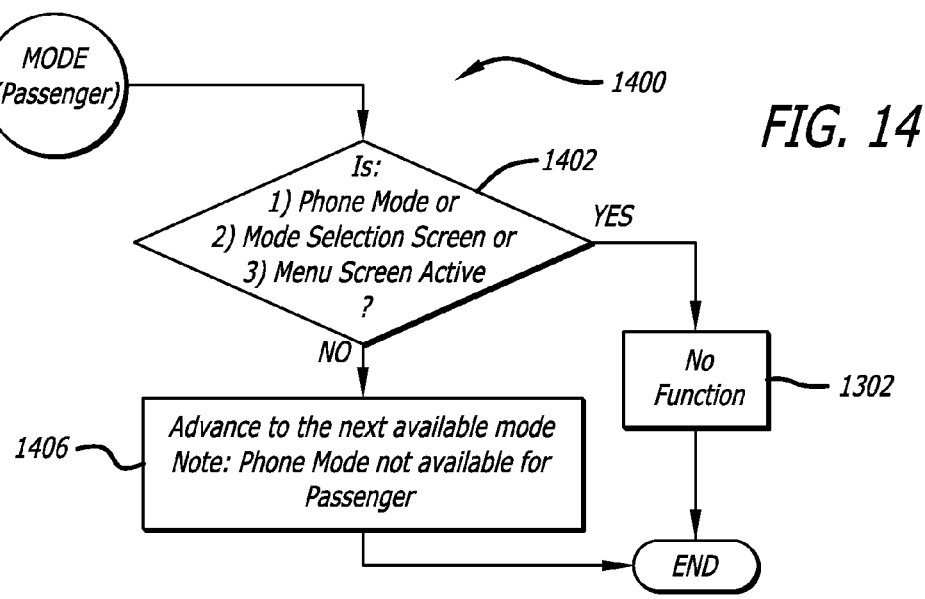
FIG. 14 is a flow diagram illustrating one method for selecting a mode from the modes displayed in FIG. 12.

Turning to FIG. 14, a flow diagram 1400 of one example of a method for selecting a mode from the modes displayed in FIG. 12 is illustrated. It may be possible to have finger control devices for a passenger to use, if so, the steps may be if the phone mode, mode selection screen, or menu screen is active or being displayed 1402, then no further action is taken 1404. If the phone mode, mode selection screen, or menu screen are not active 1402, then the course may be advanced to the next available mode 1406.

Figure 15:
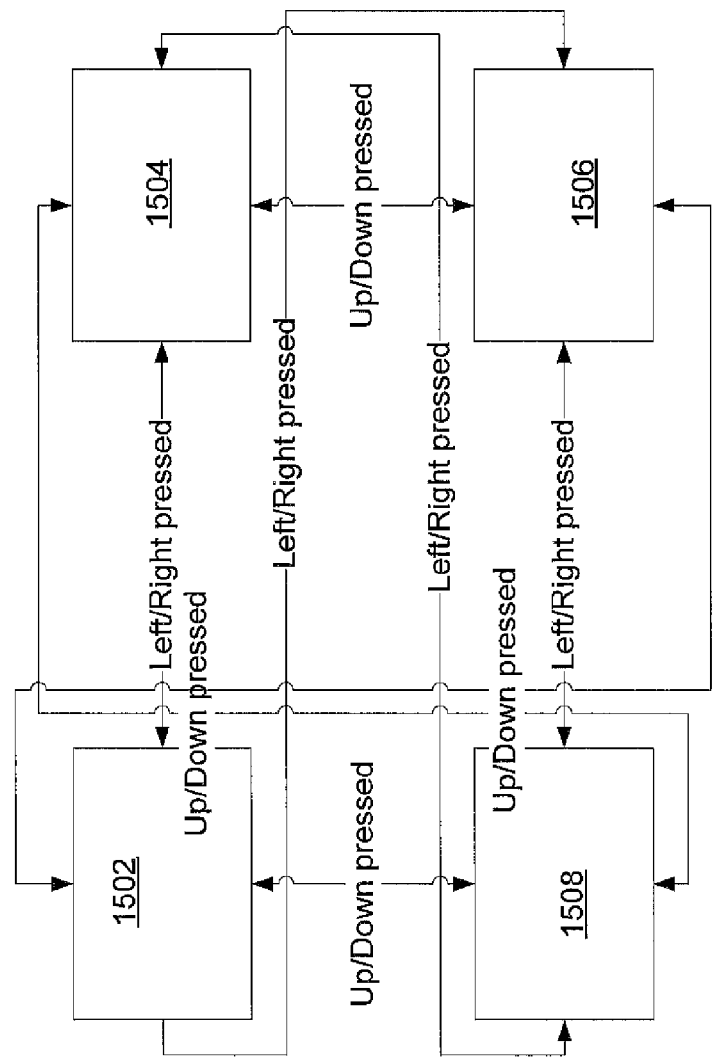
FIG. 15 is a state diagram illustrating example states of the cursor as controlled by the finger control device.

FIG. 15 is a state diagram 1500 illustrating example states of the cursor as may be controlled by the finger control device 212. Four states are shown 1502, 1504, 1506, and 1508. Additional states may be added with such motions as quick motions, such as up, down, left, or right, combination of motions, such as down-up, up-down, right-down, etc.

Figures 1, 16:
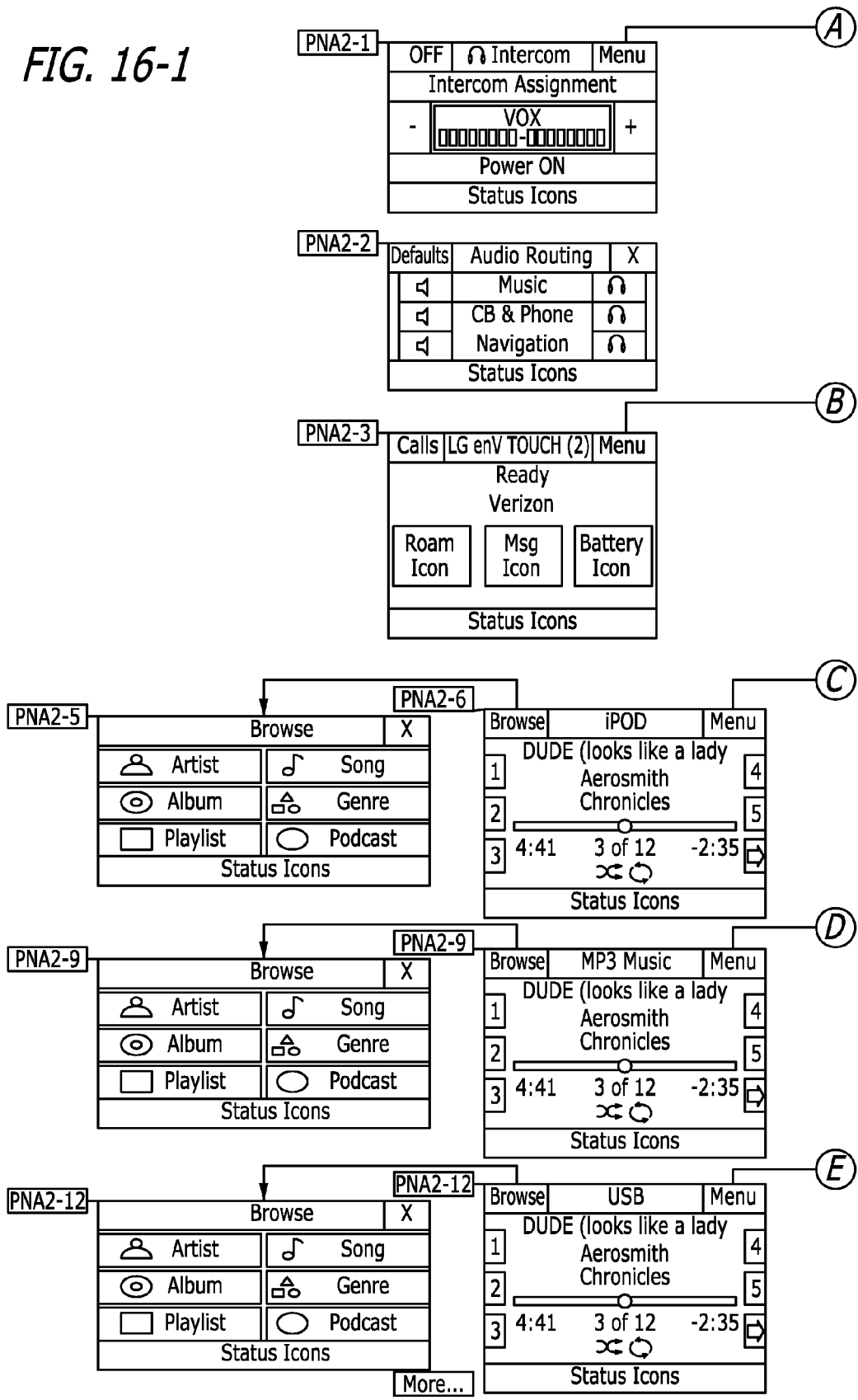
FIG. 16 is a diagram of examples of various submenus that may be presented to a user for the different modes of FIG. 12.

In FIG. 16, a diagram of example submenus 1600 that may be presented to a user for the different modes of FIG. 12 is depicted. Some of the sub-menus 1600 may be directed to controlling MP3 players, such as submenu 1602. Specific menu items, such as track list 1604 may further be provided. The track list command 1604 may result in a list of all tracks available on the MP3 player being controlled by the currently selected mode. A user may use the MP3 setup submenu to save the query of the MP3 player in a database located in memory. The query may then be assigned to a preset and quickly executed with minimal actions. The types of queries that may be stored and recalled include replaying the recorded steps, such as selecting a song, displaying a plurality of playlists, shuffling the order of play back of a playlist, to name but a few examples. In other implementations, a user may use the MP3 setup submenu to record a number of steps to activate or use a feature of the MP3 player and create a one or more presets for replaying the recorded steps, such as selecting a song, displaying a plurality of playlists, shuffling the order of play back of a playlist, to name but a few examples. The ability to record the steps for setting up the MP3 player or other devices in other modes enables users to operate the other devices with minimal steps.

Figures 2, 16:
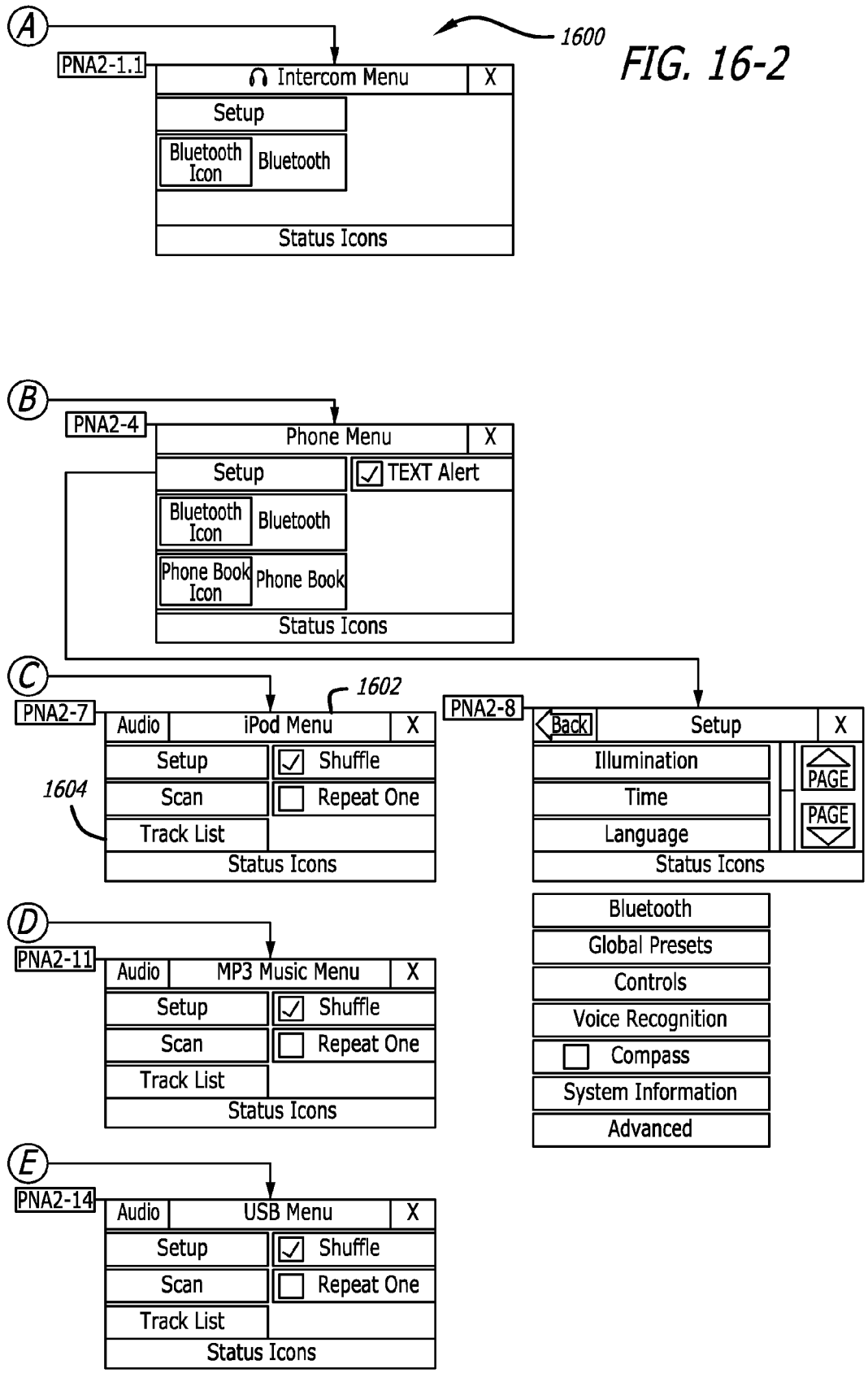
Figure 17:
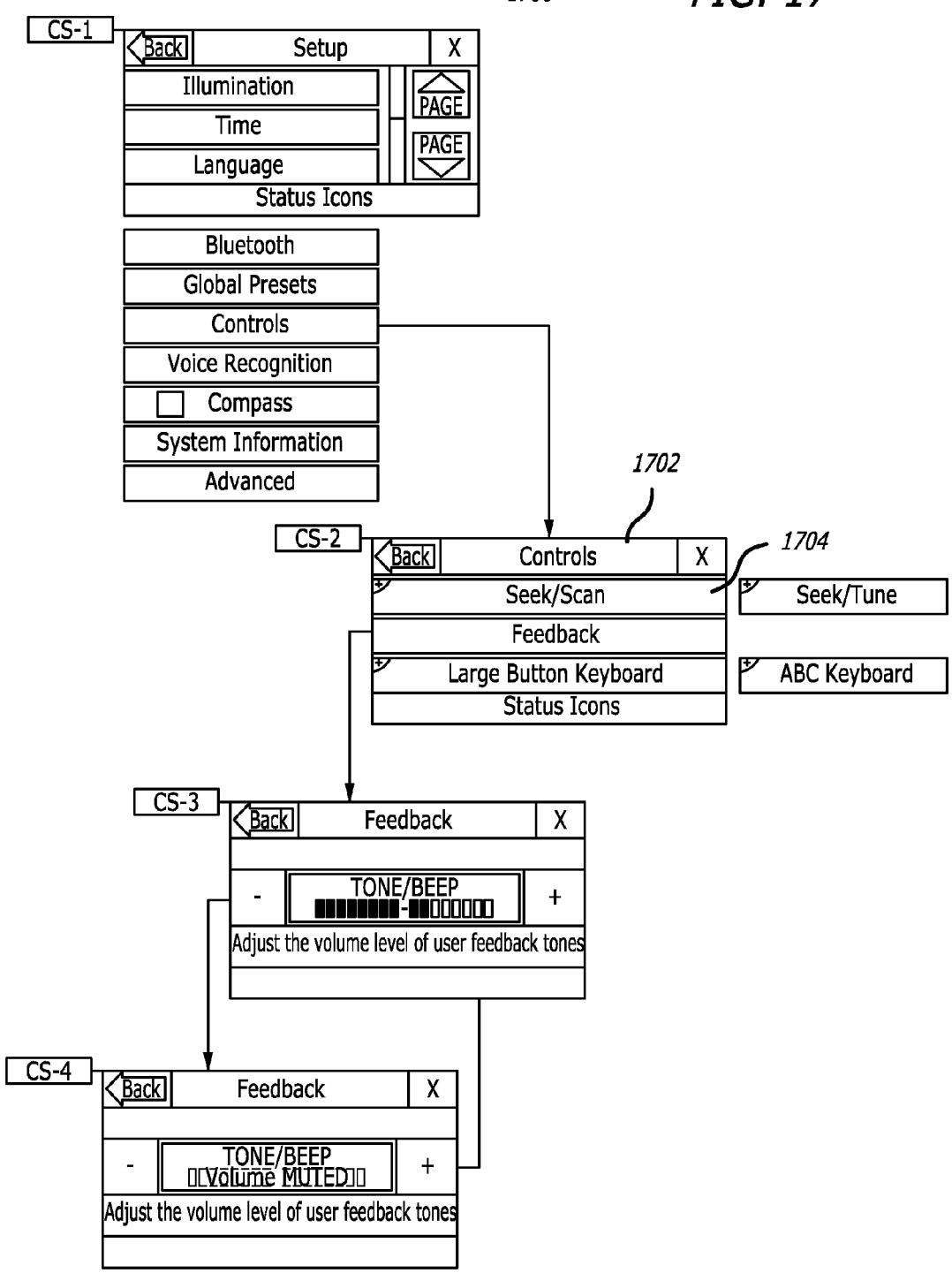
FIG. 17 is a diagram of an example of a setup submenu in accordance with one implementation of the invention.

Turning to FIG. 17, a diagram of an example of a setup submenu 1700 is depicted. Controls 1702 may be selected via a course as one of the submenu functions 1702. Under controls 1702, a user may select between seek/scan 1704. For example, a short press on the pin 206 (FIG. 2), may result in the seek/scan module or function being toggled between seeking and scanning Similarly, other submenu selections shown in FIG. 16 may also be toggled by use of a short pressing of the pin 206.

Figures 1, 18:
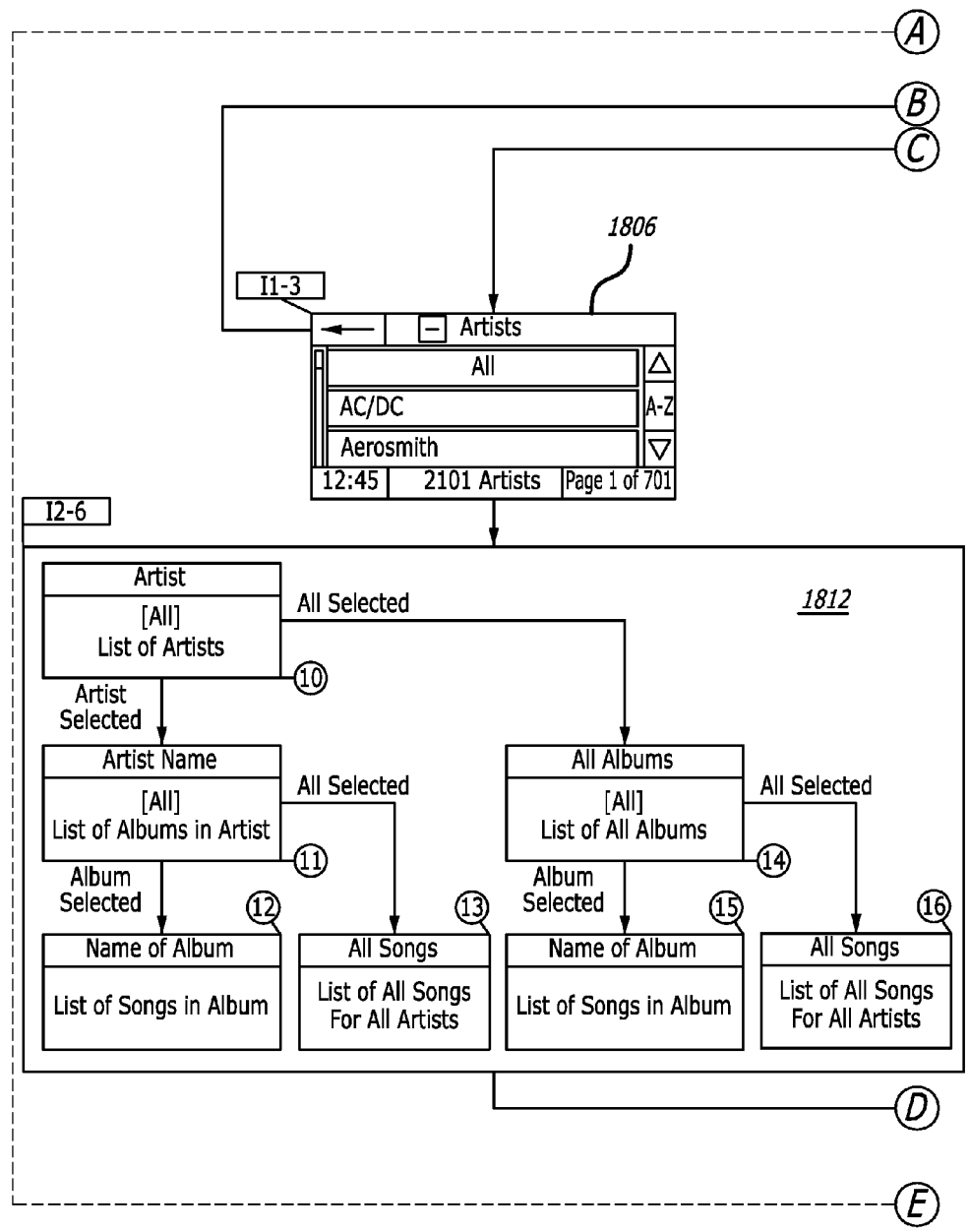
FIG. 18 is a diagram of examples of various menus that may be accessible in a MP3 mode for display in the vehicle audio system of FIG. 3.

Turning to FIG. 18, a diagram 1800 of example menus accessible in an MP3 mode for display in the vehicle audio system 106 of FIG. 3 is shown. The hierarchical configuration of the menus starts with a top menu 1802 and allows transition to a browse menu 1804. From the browse menu 1804, a user may access an artist menu 1806, albums menu 1808, song menu 1810, or return to the top level menu 1802. The artist menu 1806 may allow different displays of the artist data 1812. Similarly, the albums may allow for different displays of album data 1814 and the song menu may allow different arrangement of the song data to be displayed 1816. Upon selection of a song from the artist, albums or song menus, the currently selected song playing data is displayed in menu 1818.

Figures 2, 19:
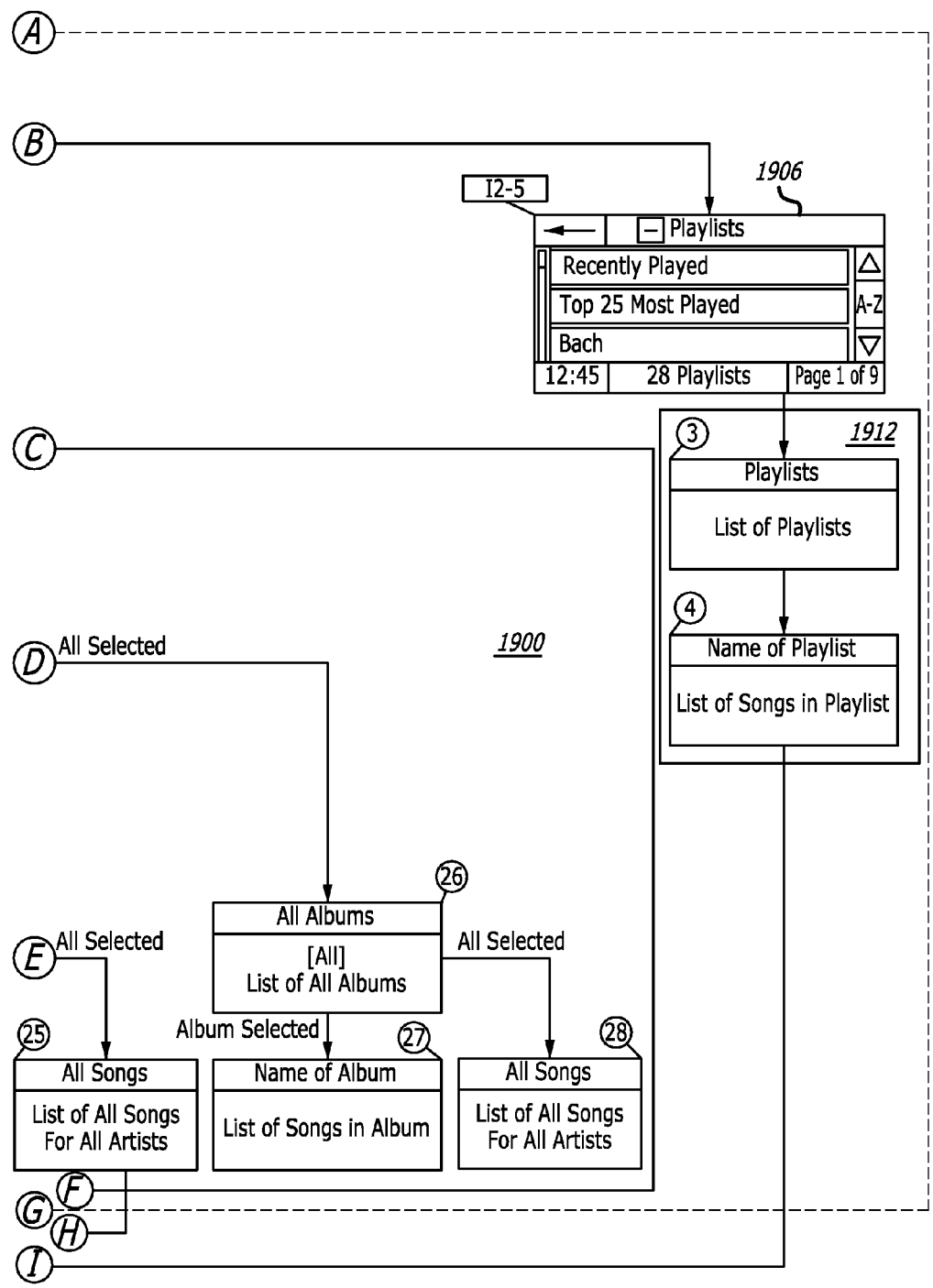
FIG. 19 is a diagram of examples of additional menus in the MP3 mode of FIG. 18 that may be displayed in the vehicle audio system of FIG. 3.

In FIG. 19, a diagram 1900 illustrates examples of additional menus in the MP3 mode that may be associated for display in the vehicle audio system 106 of FIG. 3. Additional menus under the browse menu 1804 include podcasts menu 1902, genres 1904 and playlists 1906. Under the podcasts menu 1902, a listing of all available podcasts may be displayed 1908. The genres menu 1904 may display genre information in different formats 1910. The playlist menu 1906 may display the list of playlists and/or the list of songs contained in the playlists 1912. Once a selection is made, the resulting song is played with the associated song data displayed in menu 1818.

Figures 1, 20:
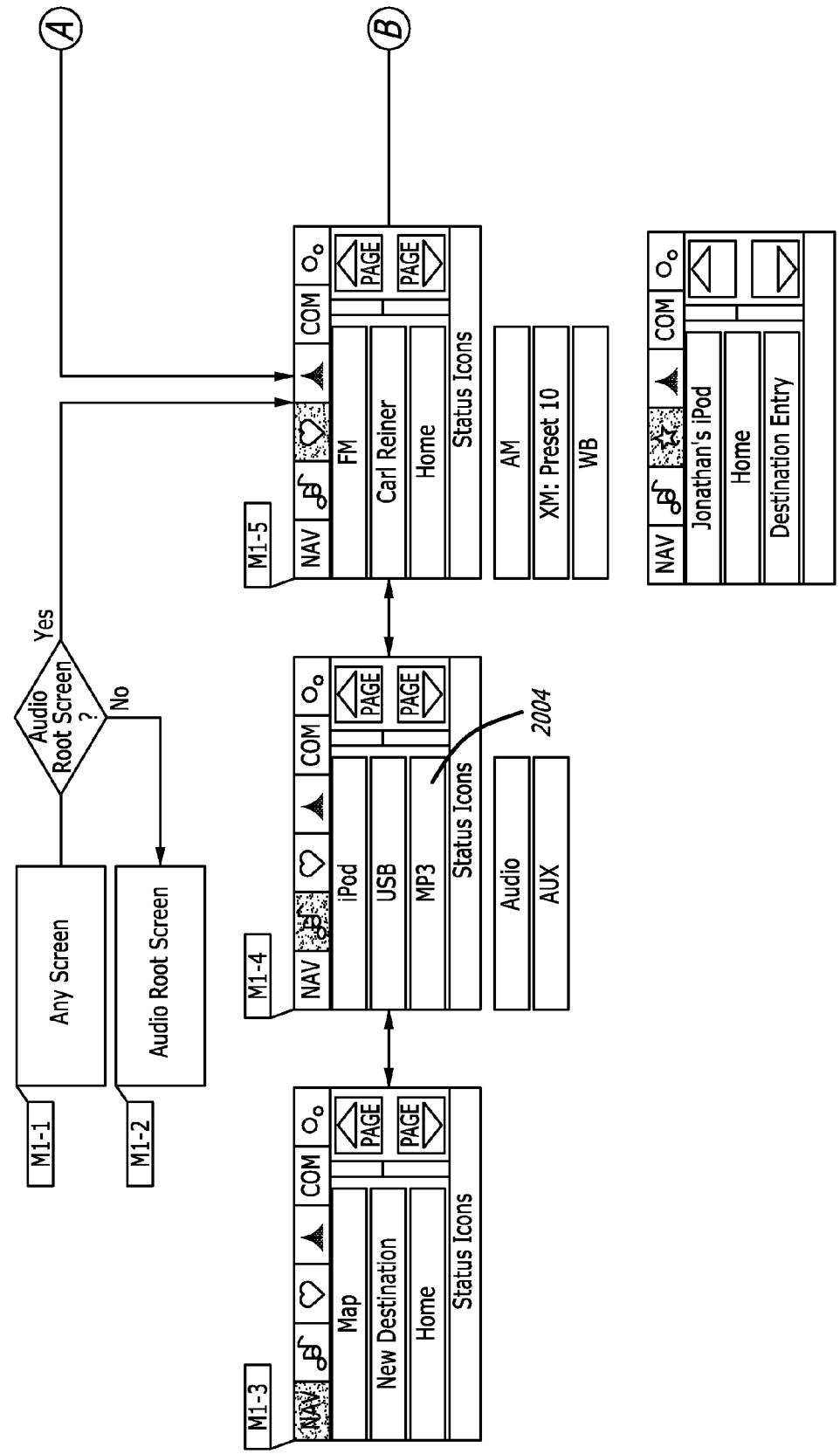
FIG. 20 is a diagram of examples of different mode menus for display in the vehicle audio system of FIG. 3.

FIG. 20 is a diagram 2000 of examples of different mode menus for display in the vehicle audio system of FIG. 3. The finger controls 108 or 110 may be configured for accessing the initial mode menu 2002 or upon a movement right or left and a short press to select a predefined preset or hot key to bring up a different mode display 2004. The presets may be associated with a specific mode in response to an action, such as a long press of the finger control 108 or 110 when the finger control is at a hot key selection (such as right or left). After the preset mode or hot key has been activated, a user may traverse the mode menus using the finger controls 108 and 110 in a similar manner as if the initial mode menu 2002 had been selected.

Traversing the menus of FIGS. 18, 19 and 20 may be accomplished using the finger controls 108 and 110 that enable a user to keep their hands on the handlebar and use their thumbs to move the sticks 206 (FIG. 2a) of each of the finger controls 108 and 110 left, right, up, and down. By pushing down on the stick 206 (FIG. 2a) may cause the button to be pushed. In other implementations, buttons may be placed around or next to the finger control that may be pressed by a single finger without removing the hand from the handlebars.

The movement of the stick of the finger controls 108 and 110 may result in the items contained in a menu being traversed. The menu item may be selected by pressing on the stick of finger controls 108 or 110. In the current implements, the finger controls 108 and 110 may be mirrored controls, each causing the same movements and actions within a menu. The advantage of such an arrangement is either right handed or left handed people with be comfortable using the finger controls. In other implementations, a single finger control may be mounted on either the right or left side of the handlebars 102.

The finger controls 108 and 110 may be electronically coupled to the vehicle audio system 106 with wires. The wires may be a plurality of wires that each transfers a motion or selection from the finger controller 108 and 110. In other implementations, a few wires may be configured as a wire bus, such as a three-wire bus that carries the signals from the finger controls 108 and 110 to the vehicle audio system 106. In yet another implementation, the finger controls 108 and 110 may individually communicate with the vehicle audio system 106 via Bluetooth or other wireless protocol or approach. Even though, the finger controllers 108 and 110 are shown with respect to handlebars, in other implementations one or more finger controllers may be placed upon a steering wheel.

The vehicle audio system 106 may be placed into a mode to define "preselects" that enables different menu item and selection queries to be stored in a database located in memory and executed via a preset or hotkey. In other implementations, the different graphical menu items and selections may be recorded and called or played back by selecting the "preset." The presets may be traversed and a desired "preset" selected that plays the previously recorded menu traversals and selections.

The approaches, menus and flow diagrams described with respect to FIGS. 1-19 may include additional steps or modules that are commonly performed during signal processing, such as moving data within memory, encoding and generating timing signals. It will be understood, and is appreciated by persons skilled in the art, that one or more processes, sub-processes, or process steps or modules described in connection with FIGS. 1-19 may be performed by hardware or hardware executing software to attain results that changes the operation and/or configuration of the vehicle audio system. If the process is performed by hardware and software executed by a controller, the software may reside in software memory (not shown) in a suitable electronic processing component or system such as, one or more of the functional components or modules schematically depicted or identified in FIGS. 1-19. The software in software memory may include an ordered listing of executable instructions for implementing logical functions (that is, "logic" that may be implemented either in digital form such as digital circuitry or source code), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor storage system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed and captured from and then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing examples of the invention. The claims and their equivalents define the scope of the invention.

What is claimed is:

1. An audio system located in a vehicle comprising:
a controller coupled to a memory;
a display coupled to the controller, where the display is configured to display a graphical menu retrieved from the memory; and
at least one finger controller having a mount adapted to mount the at least one finger controller to a handlebar, and where the at least one finger controller has at least four degrees of movement and is associated with the traversal of the graphical menu to direct a cursor generated by the controller and to direct selection by the controller of at least one preset included in the graphical menu, the at least one preset being programmable by a user to be associated with a series of commands selectable from the graphical menu or a series of commands being programmable by the user to be associated with selection of content selectable from the graphical menu, and where the series of commands is associated with control of an audio device and results in one or more playlists from the audio device being displayed on the display.

2. The audio system of claim 1, where the at least one preset has at least two modes of operation.

3. The audio system of claim 2, where a first mode of the at least two modes of operation is for activating the series of commands.

4. The audio system of claim 3, where a second mode of the at least two modes of operation is for selection of content played by the audio system.

5. The audio system of claim 1, where the association of the at least one preset with the series of commands is stored in the memory.

6. A method for traversing a graphical menu in an audio system located on a vehicle comprising:
displaying a graphical menu that has a plurality of selectable commands on a display that is responsive to a controller that is coupled to a memory;
selecting a series of commands from the plurality of selectable commands using a cursor directed by at least one finger controller, where the finger controller has a mount adapted to mount the at least one finger controller to a handlebar and where the finger controller has at least four degrees of movement and the selection of the command changes what is depicted upon the display;
recording the series of commands; and
assigning the recorded series of commands to a preset, the preset selectable with the cursor as a shortcut to initiate the recorded series of commands, where the series of commands is associated with control of an audio device and results in one or more playlists from the audio device being displayed on the display.

7. The method of claim 6, further includes selecting the preset to be in a first mode of operation where the at least one preset has at least two modes of operation.

8. The method of claim 7, where the first mode of operation is a command mode.

9. The method of claim 7, where the first mode of operation is a content mode.

10. The method of claim 6, includes storing in the memory an association of the preset with the series of commands.

11. The method of claim 6, where recording the series of commands further includes recording a plurality of transitions through the graphical menu in the memory.

12. The method of claim 6, where recording the series of commands further includes storing a device query in a database located in the memory.

13. The method of claim 6, where selecting the preset results in displaying a list of playlists from a portable audio player on the display.

14. A non-transitory computer readable media configured to store machine readable instructions executable to traverse a graphical menu in an audio system located on a vehicle, the machine readable instructions comprising:
instructions to display a graphical menu that has a plurality of selectable commands on a display, the graphical menu being responsive to a cursor directed by a controller, the controller being coupled to a memory; and
instructions to receive a series of commands from the plurality of selectable commands, the series of commands selected with the cursor using at least one finger controller, where the finger controller has a mount adapted to mount the at least one finger controller to a handlebar and where the finger controller has at least four degrees of movement and the selection of at least some commands included in the series of commands changes what is depicted upon the display;
instructions to store the series of commands in association with a preset;
instructions to execute the series of commands in response to receipt of selection of the preset with the cursor, the series of commands executed to control an audio device to display one or more playlists from the audio device on the display.

15. The computer readable media of claim 14, further includes instructions to select the preset to be in a first mode of operation where the preset has at least two modes of operation.

16. The computer readable media of claim 14, further includes instructions to store in the memory the association of the preset with the series of commands in response to a user command.

17. The computer readable media of claim 14, where the instructions to store the series of commands includes instructions to store a device query in a database located in the memory.

18. The computer readable media of claim 14, where the instructions to store the series of commands further includes instructions to record a plurality of transitions through the graphical menu in the memory.

* * * * *